US010440803B2

United States Patent
Kim

(10) Patent No.: US 10,440,803 B2
(45) Date of Patent: Oct. 8, 2019

(54) LIGHTING CONTROL APPARATUS AND METHOD THEREOF

(71) Applicant: LG Innotek Co., Ltd., Seoul (KR)

(72) Inventor: Dae Hun Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 727 days.

(21) Appl. No.: 15/010,870

(22) Filed: Jan. 29, 2016

(65) Prior Publication Data
US 2016/0270192 A1    Sep. 15, 2016

(30) Foreign Application Priority Data

Mar. 10, 2015 (KR) .................. 10-2015-0033441
Apr. 30, 2015 (KR) .................. 10-2015-0061443

(51) Int. Cl.
| | | |
|---|---|---|
| G06F 3/048 | (2013.01) | |
| H05B 37/02 | (2006.01) | |
| H05B 33/08 | (2006.01) | |

(52) U.S. Cl.
CPC ..... *H05B 37/0272* (2013.01); *H05B 33/0863* (2013.01); *Y02B 20/42* (2013.01); *Y02B 20/48* (2013.01)

(58) Field of Classification Search
CPC ........ G06F 3/041; G06F 3/048; G06F 3/0481; G06F 3/0482; G06F 3/0484; G06F 3/0488; H05B 37/02
See application file for complete search history.

(56) References Cited

U.S. PATENT DOCUMENTS

| | | | |
|---|---|---|---|
| 8,295,705 B2 | 10/2012 | Kim et al. | |
| 9,859,979 B2 | 1/2018 | Choi | |
| 2008/0281515 A1* | 11/2008 | Ann ...................... | G01C 21/20 701/434 |
| 2009/0171571 A1 | 7/2009 | Son et al. | |

(Continued)

FOREIGN PATENT DOCUMENTS

| | | |
|---|---|---|
| CN | 102388677 A | 3/2012 |
| CN | 104284477 A | 1/2015 |

(Continued)

OTHER PUBLICATIONS

Supplementary European Search Report dated Sep. 18, 2018 in European Application No. 15884792.1.

(Continued)

*Primary Examiner* — Xiomara L Bautista
(74) *Attorney, Agent, or Firm* — Saliwanchik, Lloyd & Eisenschenk

(57) ABSTRACT

A lighting control apparatus according to some exemplary embodiments includes: a touch screen configured to display a first graphic user interface in order to provide a VLC (Visible Lighting Communication) service; and a controller configured to perform visible lighting communication with at least one lighting in order to provide the VLC service selected through the first graphic user interface, wherein the VLC service may include a lighting registration service, and wherein the controller may receive unique address information of a first lighting transmitted through the visible lighting communication from the first lighting to be registered, and may register the first lighting using the received unique address information.

17 Claims, 31 Drawing Sheets

(56) References Cited

U.S. PATENT DOCUMENTS

| | | | |
|---|---|---|---|
| 2011/0010090 A1* | 1/2011 | Bae | G01C 21/00 |
| | | | 701/532 |
| 2011/0112691 A1* | 5/2011 | Engelen | H05B 37/02 |
| | | | 700/275 |
| 2011/0144773 A1* | 6/2011 | Van Herk | G05B 19/0421 |
| | | | 700/18 |
| 2012/0091896 A1 | 4/2012 | Schenk et al. | |
| 2012/0306621 A1* | 12/2012 | Muthu | H05B 37/0272 |
| | | | 340/8.1 |
| 2014/0010550 A1* | 1/2014 | Bahr | H04B 10/116 |
| | | | 398/127 |
| 2014/0280316 A1* | 9/2014 | Ganick | G06F 17/30522 |
| | | | 707/769 |
| 2014/0380234 A1* | 12/2014 | Shim | G06F 3/0482 |
| | | | 715/781 |
| 2015/0003836 A1* | 1/2015 | Yamasaki | H04B 10/116 |
| | | | 398/118 |
| 2015/0008845 A1 | 1/2015 | Kim et al. | |
| 2015/0022123 A1* | 1/2015 | Van De Sluis | H05B 37/0245 |
| | | | 315/312 |
| 2015/0147067 A1* | 5/2015 | Ryan | H04B 10/116 |
| | | | 398/118 |

FOREIGN PATENT DOCUMENTS

| | | | | |
|---|---|---|---|---|
| EP | 1480497 | * | 11/2004 | H05B 37/02 |
| KR | 10-2011-0003965 | | 1/2011 | |
| KR | 10-2011-0037820 | | 4/2011 | |
| WO | WO 2015/002414 A1 | | 1/2015 | |

OTHER PUBLICATIONS

Office Action dated Feb. 3, 2019 in Chinese Application No. 201580079878.1.

* cited by examiner (a)          (b)

LIGHTING CONTROL APPARATUS AND METHOD THEREOF

CROSS-REFERENCE TO RELATED APPLICATIONS

This application claims the benefit under 35 U.S.C. § 119 of Korean Patent Application Nos. 10-2015-0033441, filed Mar. 10, 2015, and 10-2015-0061443, filed Apr. 30, 2015, which are herein incorporated by reference in their entirety.

TECHNICAL FIELD

The exemplary embodiments proposed herein relate to a lighting control apparatus and a method thereof.

BACKGROUND

In general, a lighting apparatus is controlled by a switch.

The switch is connected to the lighting apparatus by a wire, and transfers a control signal for turning on/off the lighting apparatus according to a user's manual operations to the lighting apparatus.

However, there still remains inconvenience in that, the elderly and the infirm, as well as little child whose hand does not reach the switch, have difficulty in turn on/off the lighting apparatus, when controlling the lighting apparatus using the switch as described in the above.

Meanwhile, the market of wireless lighting control, for wirelessly controlling lightings in offices, stores and homes, is recently being expanded. Here, installation of communication module is required at the lighting apparatus, in order to wirelessly control the lighting apparatus.

In addition, in order to control a particular lighting apparatus among a plurality of lighting apparatuses, a lighting control signal is required to be transmitted to a communication module installed at a particular lighting apparatus through a gateway device using wireless communication.

In addition, a location of the particular lighting apparatus and a unique address (for example, a MAC address) of a communication module installed at the particular lighting apparatus are required to be identified.

Accordingly, when installing a new lighting apparatus, the conventional technology requires a series of processes where an installation location of the new lighting apparatus and a unique address of a communication module installed at the new lighting apparatus are identified, and the unique address of the communication modules is matched to the identified installation location of the communication module to register a new lighting apparatus.

Such registration process of the lighting apparatus is performed by a series of methods where a person who installs the new lighting apparatus identifies a unique address of a communication module installed at the new lighting apparatus, and personally inputs the identified unique address.

However, the problem of the conventional technology is that, in a case where an installing person installs inputs a wrong unique address of the lighting apparatus, then another lighting apparatus, other than the lighting apparatus that the user wants to control, is controlled. Another problem is that, in such case, the user cannot specify the unique address of the lighting apparatus desired to be controlled, and therefore cannot control the lighting apparatus desired to be controlled.

Therefore, in order to correct the wrongfully inputted unique address of the lighting apparatus, there are required inconvenient processes such as dismantling the lighting apparatus installed at the ceiling, identifying a unique address from a communication module installed at the dismantled lighting apparatus, and proceeding again the registration process for the lighting apparatus using the identified unique address.

In addition, conventional problematic technology as described in the above may re-surface when changing locations of installed lighting apparatuses, when additionally installing a new lighting apparatus, or when dismantling a lighting apparatus.

BRIEF SUMMARY

According to some exemplary embodiments, there is provided a lighting control apparatus and a method thereof capable of registering a lighting apparatus in a more simple and convenient manner.

According to some exemplary embodiments, registering process of the lightings may be facilitated through visible lighting communication between a lighting apparatus and a lighting control apparatus, whereby control of the registered lighting apparatus can be also promoted.

In addition, according to some exemplary embodiments, various data services may be provided with the lighting control apparatus, based on data provided through the registered lighting.

In addition, according to some exemplary embodiments, information about a moving route of a user may be provided, using location information of lightings installed at a location where the user is present.

Technical challenges to be achieved by the proposed exemplary embodiments are not limited to the above-mentioned technical challenges. Other technical challenges that are not mentioned herein will be clearly understandable for persons skilled in the technical field to which exemplary embodiments suggested from the following description belong.

In a general aspect, a lighting control apparatus is provided, the lighting control apparatus comprising:

a touch screen configured to display a first graphic user interface in order to provide a VLC (Visible Lighting Communication) service; and a controller configured to perform visible lighting communication with at least one lighting in order to provide the VLC service selected through the first graphic user interface, wherein the VLC service may include a lighting registration service, and wherein the controller may receive unique address information of a first lighting transmitted through the visible lighting communication from the first lighting to be registered, and may register the first lighting using the received unique address information.

In some exemplary embodiments, the first graphic user interface may include a first area displaying a selection menu for selecting a VLC service among a plurality of VLC services, and a second area displaying communication connection status information of a receiver configured to perform visible lighting communication with the first lighting.

In some exemplary embodiments, the first area may include a first selection menu for selecting the lighting registration service, a second selection menu for selecting a data service, a third selection menu for selecting a VLC status checking service, and a fourth selection menu for selecting an indoor navigation service menu.

In some exemplary embodiments, the touch screen may display a second graphic interface for providing the lighting registration service, and the second graphic user interface may include a first domain displaying map data for setting an installation location of the first lighting, and a second domain displaying a plurality of lighting icons distinguishable from one another by types of lightings.

In some exemplary embodiments, the setting the installation location of the first lighting may be performed by touching and moving a first lighting icon among the plurality of lighting icons displayed on the second domain toward a first location of the map data displayed on the first domain.

In some exemplary embodiments, the first lighting icon may be displayed on the first location of the map data, and the installation location of the to-be-registered-first lighting may be set as a real-space location corresponding to the first location to which the first lighting icon is moved on the map data.

In some exemplary embodiments, the unique address information may include a MAC address of a communicator provided in the first lighting.

In some exemplary embodiments, the first lighting may generate an ON/OFF signal by modulating the MAC address and a dimming signal, and may irradiate visible light according to the generated ON/OFF signal.

In some exemplary embodiments, the controller may receive the irradiated visible light using a receiver, and may perform photoelectric conversion and demodulation of the received visible light to obtain unique address information of the first lighting included in the visible light.

In some exemplary embodiments, the touch screen may further display a third graphic user interface for providing a data service, and the third graphic user interface may include a screen for selecting data to be linked in response to a second lighting.

In some exemplary embodiments, the data to be linked may include at least one of a motion picture, a picture, a text, and linked address information.

In some exemplary embodiments, the controller may receive, through the visible lighting communication, information with respect to the data linked in response to the second lighting, and may output data in response to the information received through the touch screen.

In some exemplary embodiments, the information with respect to the linked data may include at least one of unique address information of the second lighting and information on the data linked in response to the second lighting.

In some exemplary embodiments, the data linked to the second lighting may include at least one of data stored in the lighting control apparatus and data provided from a server providing the VLC service.

In some exemplary embodiments, the controller may receive data transmitted from surrounding lighting through the visible lighting communication, and may display a receiving status screen including information with respect to receiving status of the received data, based on selection of the third selection menu in the first area.

In some exemplary embodiments, the touch screen may further display a third graphic user interface for providing a data service, wherein map data in response to a third lighting installed at a current location of a user may be displayed on the third graphic user interface, and the current location of the user may be displayed at a location where the third lighting is installed on the map data.

In some exemplary embodiments, the controller may obtain unique address information of the fourth lighting by performing visible lighting communication with the fourth lighting when the current location of the user is moved to a location at which a fourth lighting is installed, and may ascertain an installation location in response to the obtained unique address information on the map data, wherein the location at which the fourth lighting is installed on the map data may be displayed on the third graphic user interface as a moved location of the user, and a route from the location where the third lighting is installed to the location where the fourth lighting is installed may be displayed as a moving route of the user.

In another general aspect, there is provided an operation method of a lighting control apparatus, the operation method comprising:

displaying a first graphic user interface for selecting at least one VLC (Visible Lighting Communication) service;

displaying a second graphic user interface for registering a first lighting, based on selection of a first selection menu for lighting registration on the first graphic user interface;

receiving unique address information of the first lighting transmitted through visible lighting communication from the first lighting to be registered; and registering the first lighting using the received unique address information of the first lighting when the second graphic user interface is displayed.

In some exemplary embodiments, wherein the first graphic user interface may include a first area displaying a selection menu for selecting a VLC service among a plurality of VLC services, and a second area displaying communication connection status information of a receiver configured to perform visible lighting communication with first lighting.

In some exemplary embodiments, the second graphic user interface may include a first domain displaying map data for setting an installation location of the first lighting, and a second domain displaying a plurality of lighting icons distinguishable from one another by types of lightings, wherein the setting the installation location of the first lighting may be performed by touching and moving a first lighting icon among the plurality of lighting icons displayed on the second domain toward a first location of the map data displayed on the first domain.

In some exemplary embodiments, the first lighting icon may be displayed on the first location of the map data when the first lighting icon is moved to the first location of the map data, and the installation location of the first lighting to be registered may be set as a real-space location corresponding to the first location to which the first lighting icon is moved on the map data.

In some exemplary embodiments, the operation method of a lighting control apparatus may further comprise:

displaying a third graphic user interface for providing a data service, based on selection of a second selection menu for providing a data service on the first graphic user interface, wherein the third graphic user interface may include a screen for selecting data to be linked in response to a second lighting.

In some exemplary embodiments, the operation method of a lighting control apparatus may further comprise:

receiving information with respect to the data linked in response to the second lighting through the visible lighting communication; and outputting data in response to the received information, wherein the information with respect to the data linked may include at least one of unique address information of the second lighting and data linked in response to the second lighting.

In some exemplary embodiments, the operation method of a lighting control apparatus may further comprise:

receiving data transmitted from surrounding lighting through the visible lighting communication based on selection of a third selection menu for checking VLC status on the first graphic user interface; and displaying a fourth graphic user interface including information with respect to receiving status of the received data.

In some exemplary embodiments, the operation method of a lighting control apparatus may further comprise:

displaying map data in response to a third lighting installed at a current location of a user and the current location of the user at a location where the third lighting is installed on the map data, based on selection of an indoor navigation service menu on the first graphic user interface.

In some exemplary embodiments, the operation method of a lighting control apparatus may further comprise:

changing the current location of the user to a location where the fourth lighting is installed when the current location of the user is moved to a location where a fourth lighting is installed; and displaying a route from the location where the third lighting is installed to the location where the fourth lighting is installed as a moving route of the user.

According to some exemplary embodiments, the user may dispose a device having map information of a location where the lighting apparatus is installed under the lighting apparatus that the user desires to register, and configure the device to receive unique address transmitted by the lighting apparatus using a VLC (Visible Light Communication). Thereby, the user can easily identify unique address of the lighting apparatus, without dismantling the lighting apparatus installed at the ceiling.

According to some exemplary embodiments, registration process for a plurality of lighting apparatuses may be automatically performed using unique address respectively transmitted from the plurality of lighting apparatuses. Thereby, time consumed in registration of the lighting apparatuses can be significantly reduced, and the problem of wrongfully inputted unique address can be overcome as well.

According to some exemplary embodiments, when additionally installing, dismantling, or maintaining a lighting apparatus, the relevant unique address of the particular lighting apparatus may simply be identified and registered. Thereby, user convenience can be significantly improved.

According to some exemplary embodiments, various data information for providing data service may be linked with the lighting apparatus, and various data service (for example, real-time event information, advertisement information, additional information about a particular location, etc.) using the linked data information may be provided. Thereby, user convenience can be significantly improved.

According to some exemplary embodiments, a current location of the user may be easily provided based on a location of the lighting apparatus installed at the user's location, and information such as a moving route to the destination and historical moving route may be efficiently provided using the map data. Thereby, user convenience can be significantly improved.

DETAILED DESCRIPTION

Descriptions hereinafter are merely exemplifying the principle of the present disclosure. Thus, the persons who skilled in the art of the present disclosure, although not clearly described or illustrated herein, may implement the principle of the present disclosure and may invent various apparatuses included in the scope and the concept of the present disclosure. In addition, all conditional terms and exemplary embodiments described herein, in principle, shall be intended clearly to make the concept of the present disclosure understood, and shall not be limited by the embodiments and the modes described herein.

In addition, not only principles, viewpoints, and embodiments, but also all the descriptions for a particular embodiment shall be understood to include structural and functional equivalents for these elements. Also, these equivalents shall be understood to include not only prior equivalents but also equivalents to be developed in the future, in that, to include all element invented to perform the same functions regardless of the structure thereof.

According to some exemplary embodiments, a lighting system is provided, and the lighting system may register a plurality of lightings using a lighting control apparatus such as a terminal device, and can wirelessly control the registered plurality of lightings.

Figure 1:
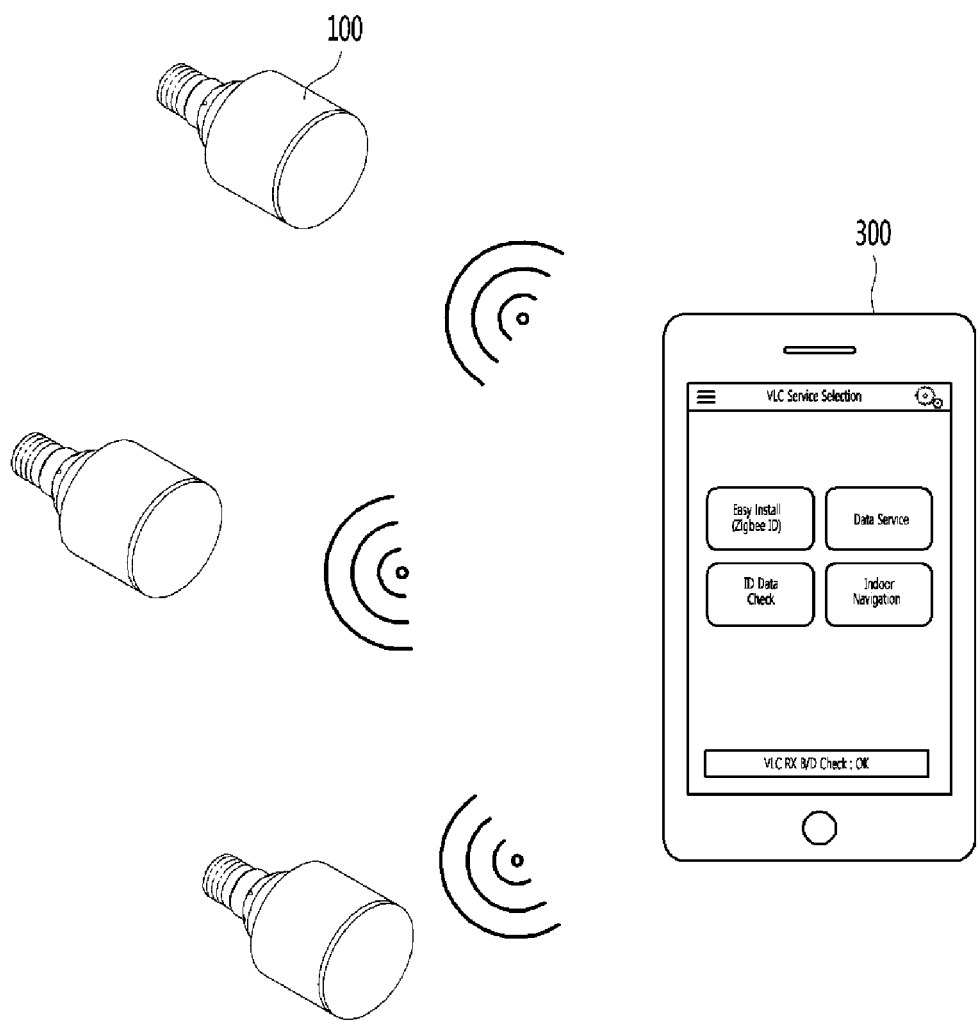
FIG. 1 is a block diagram illustrating a lighting system according to an exemplary embodiment of the present disclosure.
Figure 2:
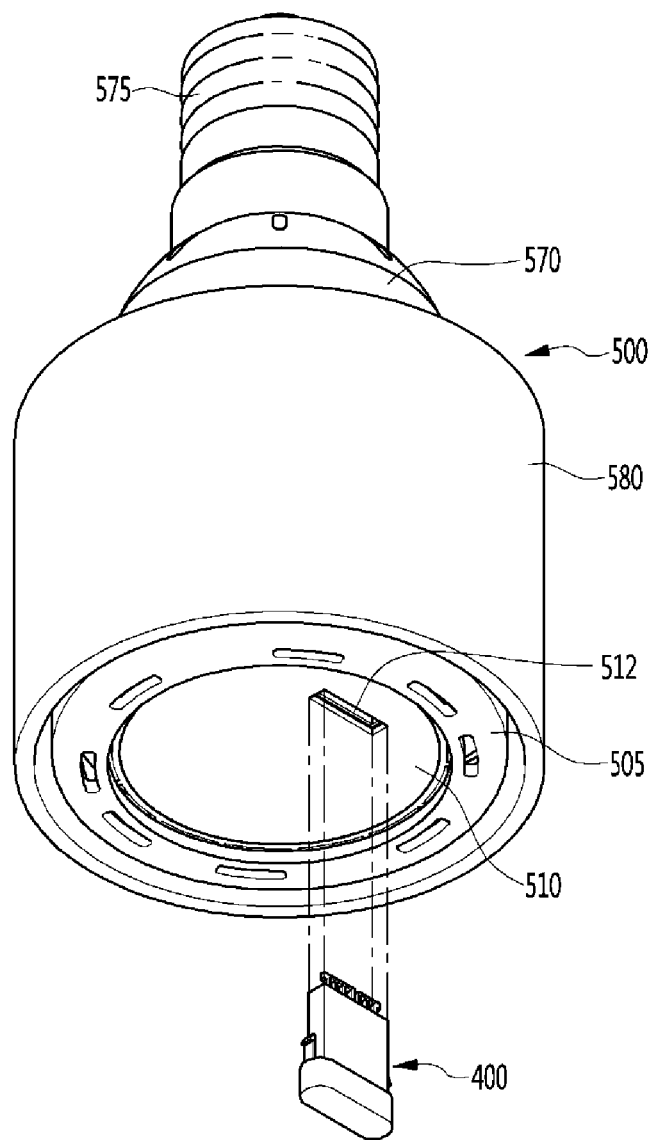
FIG. 2 is a perspective view illustrating a detailed structure of a lighting apparatus illustrated in FIG. 1.
Figure 3:
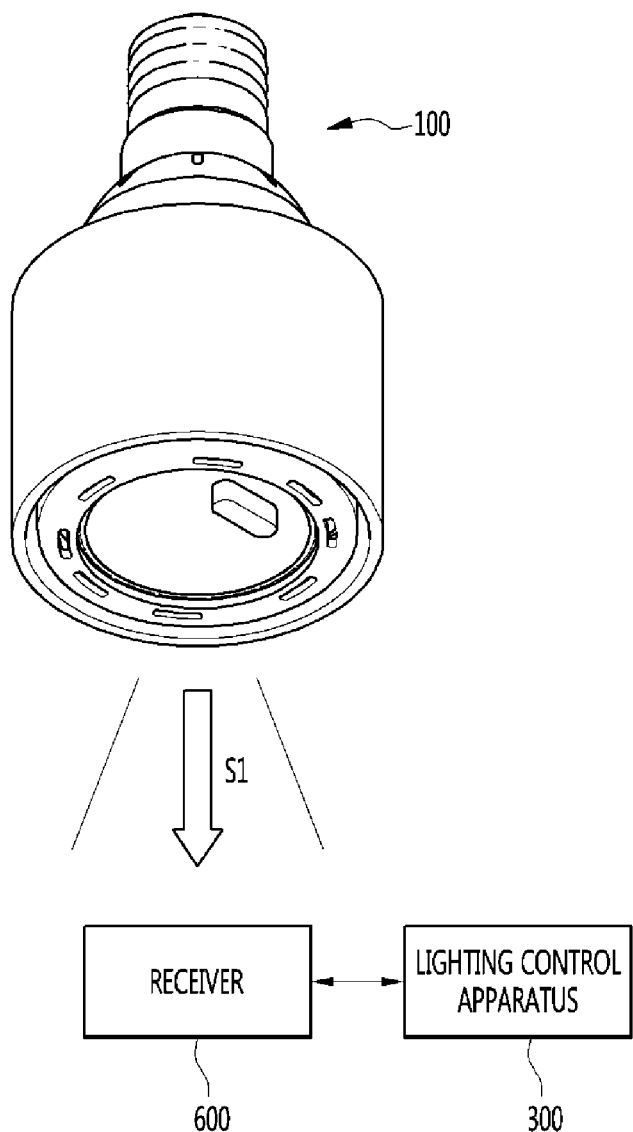
FIG. 3 is a block diagram illustrating registration process of a lighting apparatus according to an exemplary embodiment of the present disclosure.
Figure 4:
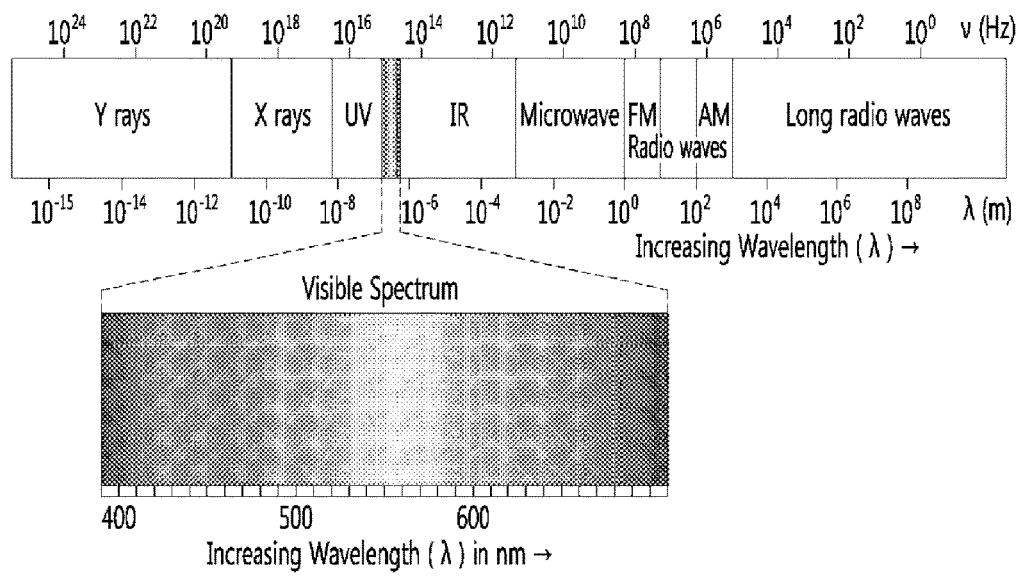
FIG. 4 is a figure illustrating spectrum of signals transmitted from a lighting apparatus according to an exemplary embodiment of the present disclosure.
Figure 5:
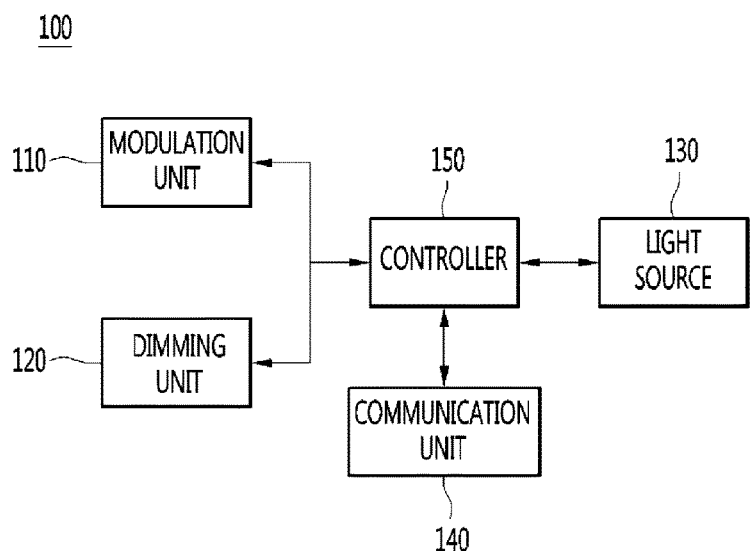
FIG. 5 is a block diagram illustrating a detailed structure of a lighting apparatus illustrated in FIG. 1.
Figure 6:
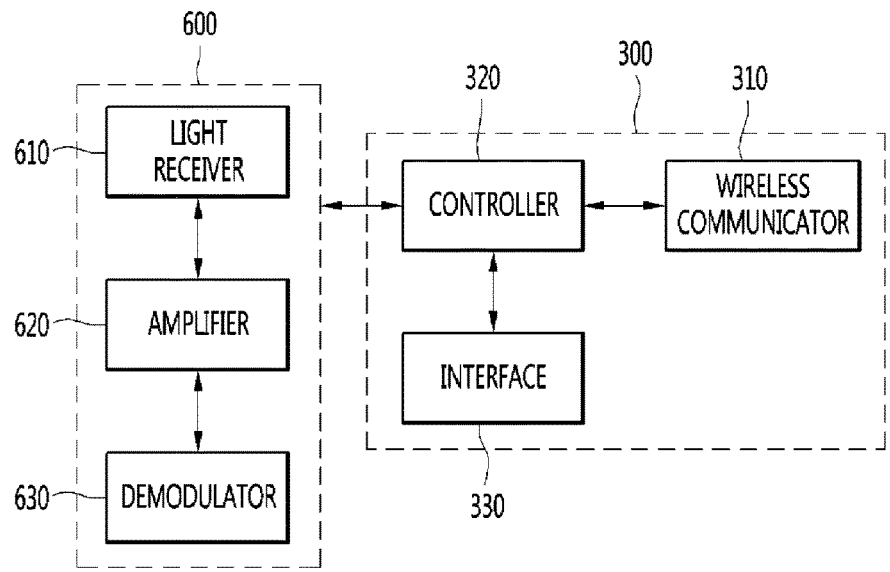
FIG. 6 is a block diagram illustrating a detailed structure of a lighting control apparatus illustrated in FIG. 1.

FIG. 1 is a block diagram illustrating a lighting system according to an exemplary embodiment of the present disclosure; FIG. 2 is a perspective view illustrating a detailed structure of a lighting apparatus illustrated in FIG. 1; FIG. 3 is a block diagram illustrating registration process of a lighting apparatus according to an exemplary embodiment of the present disclosure; FIG. 4 is a figure illustrating spectrum of signals transmitted from a lighting apparatus according to an exemplary embodiment of the present disclosure; FIG. 5 is a block diagram illustrating a detailed structure of a lighting apparatus illustrated in FIG. 1; and FIG. 6 is a block diagram illustrating a detailed structure of a lighting control apparatus illustrated in FIG. 1.

Referring to FIG. 1, a lighting system according to some exemplary embodiments may include a lighting control apparatus (300) and at least one lighting (100).

The lighting control apparatus (300) may be connected to a plurality of lightings (100) through a wireless network.

The lighting control apparatus (300) may store an application, and may execute the stored application to provide a graphic user interface for controlling the lighting (100).

In addition, the lighting control apparatus (300) may provide a graphic user interface. The graphic user interface search for a plurality of unregistered lightings (100), and can register the searched lightings (100) to control operation of the registered lightings (100).

The lighting control apparatus (300) may be a terminal device to store and execute the application. The terminal device may include at least one of a mobile phone, a smart phone, a portable smart device, a digital camera, a laptop computer, a digital broadcasting device, a PDA (Personal Digital Assistant), a PMP (Portable Multimedia Player), and a navigation device.

However, the present exemplary embodiment is not limited hereto. Therefore, any device that is able to download and install an application as well as to perform various wireless communications may be included in the lighting control apparatus (300).

The lighting (100) may be controlled by a device such as a dimming device. The lighting (100) may include at least one lighting. The lighting (100) may include a plurality of lightings.

For example, the lighting (100) may include a first lighting installed at a ceiling of a bedroom, and a second lighting installed at a table of a bedroom. Alternatively, the lighting (100) may include a first lighting installed in a first conference room, a second lighting installed in a second conference room, and a third lighting installed at a tea room.

The lighting control apparatus (300) is an input method for receiving a command to control the lighting (100) from the user. The lighting control apparatus (300) may be connected with the lighting (100) through wireless network, to transmit a control signal by the command to the lighting (100).

The wireless network of the lighting control apparatus (300) may be determined according to a wireless network environment.

For example, At least one network of ZigBee, Bluetooth, and Z-wave may be employed in the light control apparatus (300) to perform a wireless communication with the lighting (100).

In addition, the light control apparatus (300) may receive data transmitted from the lighting (100) as well as a means to control the lighting (100), and may perform an operation of registering the lighting (100) based on the received data.

In addition, the lighting control apparatus (300) may set information for providing a particular data service to the lighting, and may receive information transmitted from the lighting (100) to provide data service linked in response to the information.

The lighting (100) may have a configuration as illustrated in FIG. 2.

The lighting (100) may include a lighting module (500) and a communication module (400).

The lighting module (500) may include a connection terminal (575) at an upper portion of the lighting module (500), an internal case (570) including an insertion portion at a lower portion the internal case (570), a heat radiating body (not illustrated) being inserted into the insertion portion of the internal case (570), an illuminating module emitting light and including a plurality of luminous elements, a guide member (505) concretely fixing the illuminating module at the heat radiating body, a lens (510) formed between the guide member (505) and the illuminating module, and an external case (580) disposed at an external side of the heat radiating body.

The lens (510) may include a lens opening (512) to insert a communication module (400). In addition, the communication module (400) may be inserted in the lens opening (512).

The communication module (400) inserted through the lens opening (512) may be connected to a connector of a power controller. Accordingly, the communication module (400) may transfer a control signal transmitted through the lighting control apparatus (300) to the lighting module (500).

As described in the above, the lighting system including a plurality of wirelessly controllable lightings (100) may control the lighting apparatus in real-time through a graphic user interface provided through a touch screen of the lighting control apparatus (300) according to execution of the application.

As illustrated in FIG. 3, the lighting system may perform a process to register a unique address of the lighting (100), in order to control the lighting (100).

Here, the registration of the lighting means a series of processes including identifying a location of the lighting (100) on a map showing the place where the lighting is installed, matching the identified location with a unique address of a communication module installed at the lighting (100), and storing the matched location and unique address.

Here, the unique address of the lighting (100) may be a MAC (Media Access Control) address of the communication module installed at the lighting apparatus (100).

The lighting (100) may store its own unique address, and may output address information (S1) with respect to the stored unique address according to a request from the outside.

Here, the address information (S1) may be outputted by being included in visible light. The visible light refers to light within a wavelength range detectable by human eyes, and the wavelength range may be 380-700 nm.

Accordingly, the user may dispose the lighting control apparatus (300) installed with a receiver (600) as illustrated in FIG. 3 at a place where the lighting (100) is installed.

Successively, the receiver (600) may receive visible light emitted through the lighting (100). Here, the received visible light may include address information with respect to the lighting (100).

When the visible light is received, the receiver (600) may extract address information (S1) included in the received visible light, and may store and register unique address of the lighting (100) using the extracted address information (S1).

Referring to FIG. 4, the address information (S1) may be outputted by being included in the visible light spectrum.

The visible light emitted by the lighting (100) may have spectrum wavelength band of 400-700 nm. Therefore, the lighting (100) may emit by dimming light within such wavelength band according to the address information.

Hereinafter, the light (100) outputting the address information (S1) included in the visible light will be described.

Referring to FIG. 5, the lighting (100) according to some exemplary embodiments may include a modulation unit (110), a dimming unit (120), a communication unit (140), a controller (150), and a light source (130).

The light source (130) may include a plurality of LEDs (Light Emitting Diode) or fluorescent lamps.

The modulation unit (110) may store information with respect to the unique address of the lighting (100), and may modulate the stored information with respect to the unique address.

The dimming unit (120) may receive a dimming signal from the outside, process the dimming signal, and transfer the dimming signal to the controller (150).

The controller (150) may receive the unique address modulated by the modulation unit (110). In addition, the controller (150) may receive the dimming signal transferred from the dimming unit (120).

In addition, the controller (150) may generate an ON/OFF signal of the light source (130) by processing the received dimming signal with the modulated unique address.

The controller (150) may be a power source circuit to control the light source (130).

Here, the ON/OFF signal may be composed of information with respect to the unique address of the lighting (100). For example, an ON signal may be generated by the controller (150), when the digital signal value of the modulated unique address is 1.

In addition, an OFF signal may be generated by the controller (150), when the digital signal value of the modulated unique address is 0.

However, the present exemplary embodiment is not limited hereto. Alternatively, an OFF signal may be generated by the controller (150) when the digital signal value of the modulated unique address is 1, and an OFF signal may be generated by the controller (150) when the digital signal value of the modulated unique address is 0.

Therefore, the light source (130) may preform ON/OFF operation based on ON/OFF signal generated by the controller (150).

Accordingly, the visible light emitted through the light source (130) may be outputted as including the address information (S1) of the lighting apparatus, by the time and order of ON/OFF.

That is, the light source (130) may perform an illuminating operation by being divided to a plurality of operational sections, according to the ON/OFF signal.

For example, in a case where the digital signal value of the modulated unique address is '01010000', the ON/OFF signal generated by the controller (150) may be divided to eight ON/OFF sections. That is, the ON/OFF signals generated by the controller (150) may be divided by: a first section formed of an OFF signal; a second section formed of an ON signal; a third section formed of an OFF signal; a fourth section formed of an ON signal; a fifth section formed of an OFF signal; a sixth section formed of an OFF signal; a seventh section formed of an OFF signal; and an eighth section formed of an OFF signal.

Therefore, the light source (130) may perform ON/OFF operations according to the ON/OFF signals. Here, the ON/OFF operations of the light source (130) may be performed by being divided to a plurality of operational sections, in response to the ON/OFF signals. That is, the ON/OFF operation of the light source (130) may be performed by being divided to eight operational sections.

Accordingly, the light source (130) may perform an OFF operation in a first operational section, an ON operation in a second operational section, an OFF operation in a third operational section, an ON operation in a fourth operational section, an OFF operation in a fifth operational section, an OFF operation in a sixth operational section, an OFF operation in a seventh operational section, and an OFF operation in a eighth operational section.

Meanwhile, the lighting (100) may include a communication unit (140). The communication unit (140) may receive a control signal by performing communication with a gateway system (not illustrated) or other adjacent lightings (100), and may transfer the received control signal to the controller (150).

In addition, the communication unit (140) may receive data transmitted through a separate server (not illustrated).

The communication unit (140) may internally include an antenna. The communication unit (140) may receive a control signal from the outside and transmit the received control signal to the controller (150).

The communication unit (140) may include a communication integrated circuit configured to analyze the control signal by types of the wireless network. A particular communication integrated circuit may be selected from a plurality of communication integrated circuits to be mounted according to the wireless network environment.

The communication integrated circuit may support at least one of communication methods such as ZigBee, Bluetooth, Wi-Fi and Z-wave.

Meanwhile, the controller (150) may not only generate an ON/OFF signal simply including an ON signal and an OFF signal, but also generate an ON/OFF signal including ON signals in various sizes.

That is, the ON/OFF signal as described in the above includes only a single digital signal value in a section. However, in such case, electric power of the lighting (100) may be wasted, and the time consumption during registration process of the lighting (100) may be increased as well.

Therefore, the controller (150) may generate an ON/OFF signal including a plurality of digital signal values in a single ON/OFF section.

For example, a digital signal value of '00' may be generated as an OFF signal, a digital signal value of '01' may be generated as an ON signal having a first signal level, a digital signal value of '10' may be generated as an ON signal having a second signal level higher than the first signal level, and a digital signal value of '11' may be generated as an ON signal having a third signal level higher than the second signal level.

Therefore, according to some exemplary embodiments, address information with respect to unique address of the lighting apparatus may be outputted in faster time.

Meanwhile, the lighting control apparatus (300) may have a configuration as illustrated in FIG. 6. Here, the lighting control apparatus (300) may include a receiver (600) configured to receive data through visible lighting communication with the lighting (100).

The receiver (600) may include a light receiver (610), an amplifier (620), and a demodulator (630).

The light receiver (610) may be a photoelectric device configured to receive light and photoelectrically convert the received light to output the converted light as an electric signal. Here, the light receiver (610) may be implemented as a photo diode.

Here, the electric signal outputted through the light receiver may include intensity information of the signal, as well as information on whether the signal is present or not.

The amplifier (620) may amplify an electric signal outputted through the light receiver (610) to convert the amplified electric signal as in a level processable (detectable) by the demodulator (630).

The demodulator (630) may demodulate the amplified electric signal according to a code modulated by the modulation unit (110) of the lighting (100).

The signal demodulated by the demodulator (630) means address information (S1) with respect to unique address of the lighting (100). The receiver (600) may obtain the unique address information (S1), and may transfer the unique address information (S1) to the lighting control apparatus (300).

The lighting control apparatus (300) may register the lighting (100) installed at a particular location using the received unique address information.

The lighting control apparatus (300) may include a controller (320), an interface (330), and a wireless communicator (310).

The wireless communicator (310) may be formed at an inside of a main body composing the lighting control apparatus (300). Alternatively, a communication module (not illustrated) including a wireless communication chip supporting a relevant network according to a wireless network may be attachably and detachably mounted to the main body.

The controller (320) may control operation of the lighting control apparatus (300) using data stored in a memory.

The memory may store programs/protocols for operation and communication control. In addition, various applications may be downloaded and stored in the memory.

The interface (330) may receive a control signal from a user and transfer the received control signal to the controller (320). The interface (330) may include a microphone, a touchable touch screen, and various local buttons.

The controller (320) may provide image data to the interface (330) according to the stored program, and the touch screen of the interface (330) may provide a screen to the user according to the image data.

When the user provides a selection signal by touching the touch screen or by means of various conventionally known methods, the controller (320) may provide various image data in response to the selection signal.

Hereinafter, the interface (330) of the lighting control apparatus (300) will be described in more details.

The interface (330) may include a variety of interfaces. Hereinafter, the interface (300) will be referred to as a graphic user interface provided through the touch screen of the lighting control apparatus (300).

Hereinafter, various processes will be described in detail, the processes including a process to register the unregistered lighting (100) using the graphic user interface provided through the touch screen of the lighting control apparatus (300), a process to change operation status of the registered lighting (100), a process to link information for providing data service with the registered lighting (100), a process to provide the linked data service according to the linked information, and a process to provide information with respect to a current location and a moving route of the user.

At first, a detailed description will be given to the process to register the unregistered lighting (100) using the graphic user interface provided through the touch screen of the lighting control apparatus (300).

Figure 7:
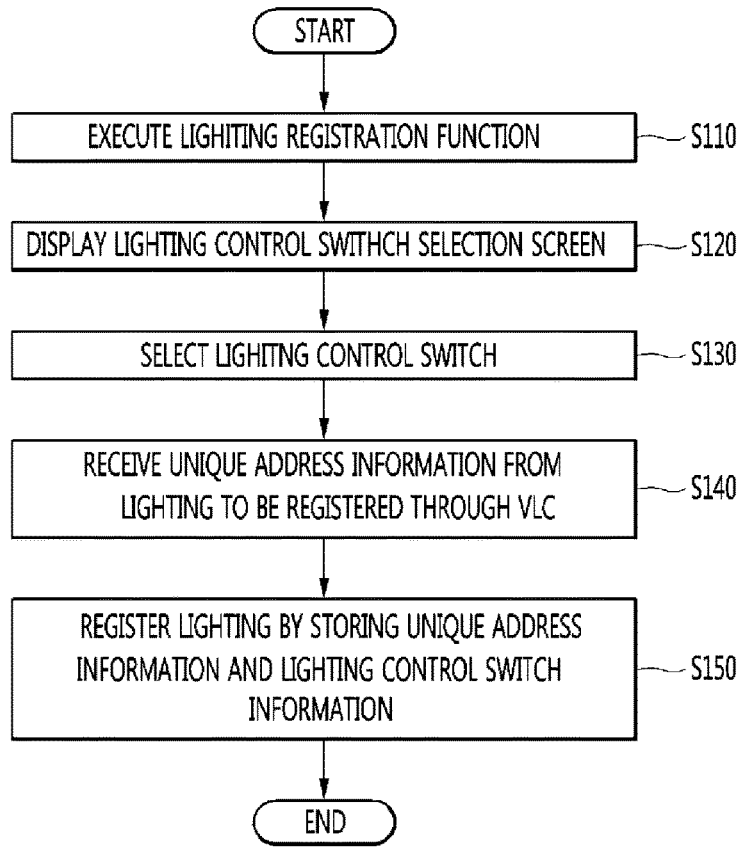
FIG. 7 is a flow chart to describe a light registration method according to a first exemplary embodiment of the present disclosure by steps.
Figure 8:
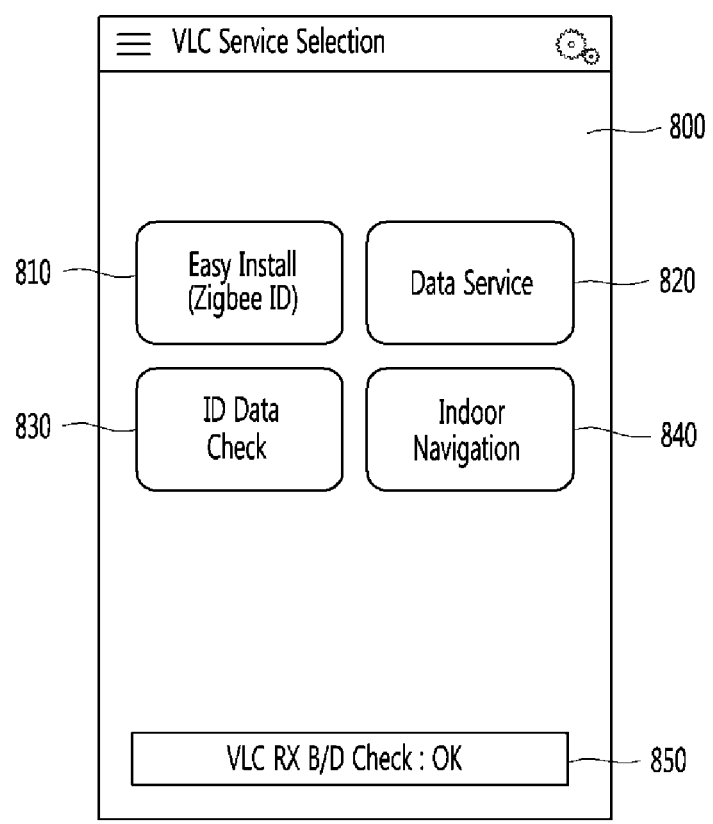
FIGS. 8 and 9 illustrate graphic user interfaces provided by the light control apparatus during the light registration according to the first exemplary embodiment.
Figure 9:
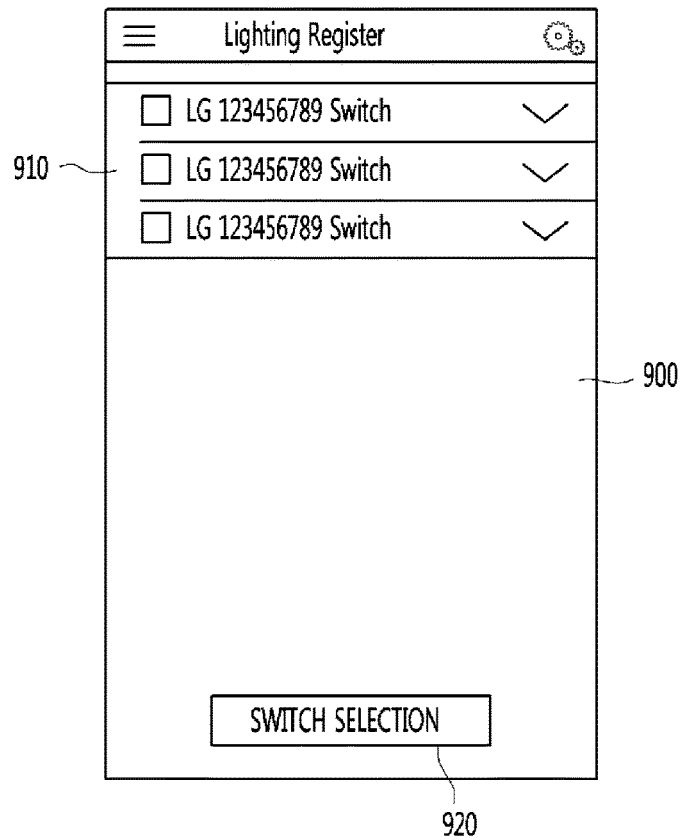

FIG. 7 is a flow chart to describe a light registration method according to a first exemplary embodiment of the present disclosure by steps, and FIGS. 8 and 9 illustrate graphic user interfaces provided by the light control apparatus during the light registration according to the first exemplary embodiment.

Referring to FIG. 7, the lighting control apparatus (300) may execute a lighting registration function (S110). For the purpose of this process, the lighting control apparatus (300) may pre-store an application to execute a VLC service for registering and controlling the lighting, and may execute the lighting registration function by running the pre-stored application.

For the purpose of this, the lighting control apparatus (300) may display a menu screen to provide the VLC service. FIG. 8 illustrates a menu screen to provide the VLC service.

Referring to FIG. 8, menu items of the VLC service may be displayed on the menu screen (800).

The menu item of the VLC service may include an Easy Install (810), a Data Service (820), an ID Data check (830), and an Indoor Navigation (840).

In addition, receiver status information (850) showing status of the receiver (600) configured to perform visible lighting communication with the lighting (100) may be displayed on the menu screen (800).

The user may execute the lighting registration function by selecting the Easy Install (810) among the menu items displayed on the menu screen (800).

Referring back to FIG. 7, upon selection of the Easy Install (810), the lighting control apparatus (300) may display a screen for selecting a lighting control switch to be linked with a lighting to be registered (S120).

FIG. 9 illustrates a lighting control switch selection screen according to an exemplary embodiment.

The lighting control switch selection screen (900) may include a first area (910) displaying a list of unregistered lighting control switches or lighting control switches arranged at a location where the lighting to be registered is to be installed, and a second area (920) displaying a switch selection menu for selecting a particular lighting control switch among the lighting control switches displayed on the first area (910).

Referring back to FIG. 7, the lighting control apparatus (300) may select a particular lighting control switch on the displayed lighting control switch selection screen (900) (S130).

That is, referring to FIG. 9, the user may select a particular lighting control switch among the lighting control switches displayed on the first area (910), and may accordingly select the switch selection menu displayed in the second area (920). Thereby, the user may set up a lighting control switch to be linked with the lighting to be registered.

Successively, the lighting control apparatus (300) may be moved to a surrounding of an installation location of the lighting (100) to be registered, and accordingly receive unique address information transmitted through the visible lighting communication from the lighting (100) to be registered (S140).

Successively, upon reception of the unique address information, the lighting control apparatus (300) may store the selected lighting control switch with the received unique address information, to register the lighting (100) (S150).

Here, the selected lighting control switch is set up as a switch to control the lighting (100) having the received unique address information. Afterwards, the operation status of the lighting (100) may be controlled using the lighting control switch.

Figure 10:
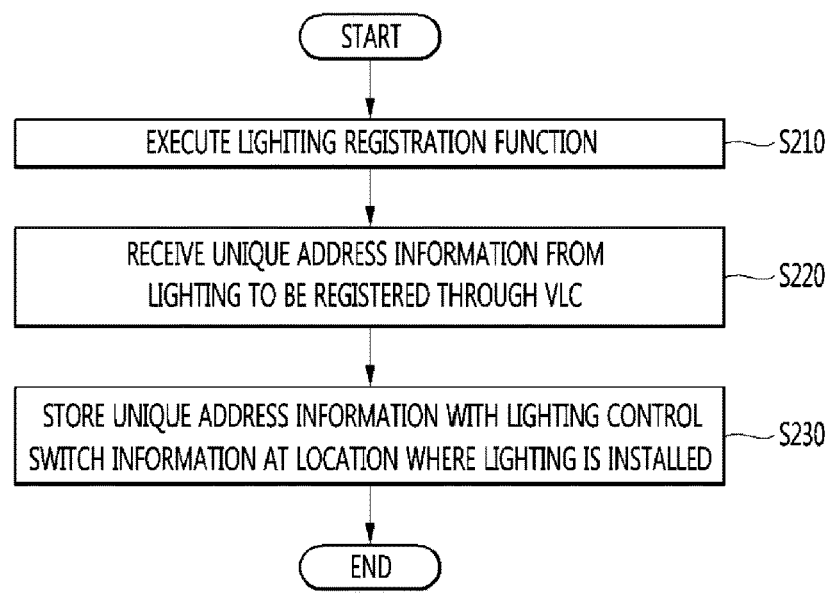
FIG. 10 is a flow chart to describe a light registration method according to a second exemplary embodiment of the present disclosure by steps.

FIG. 10 is a flow chart to describe a light registration method according to a second exemplary embodiment of the present disclosure by steps.

Referring to FIG. 10, at first, the lighting control apparatus (300) may execute the lighting registration function (S210).

Upon execution of the lighting registration function, the lighting control apparatus (300) may be moved to an area corresponding to an installation location of the lighting (100) to be registered, and accordingly receive unique address information transmitted through the visible lighting communication from the lighting (100) to be registered (S220).

Here, the lighting control switch corresponding to the lighting (100) has been allocated in advance at the location where the lighting (100) to be registered is installed.

Successively, the lighting control apparatus (300) may store the selected lighting control switch with the received unique address information, to register the lighting (100) (S230).

Figure 11:
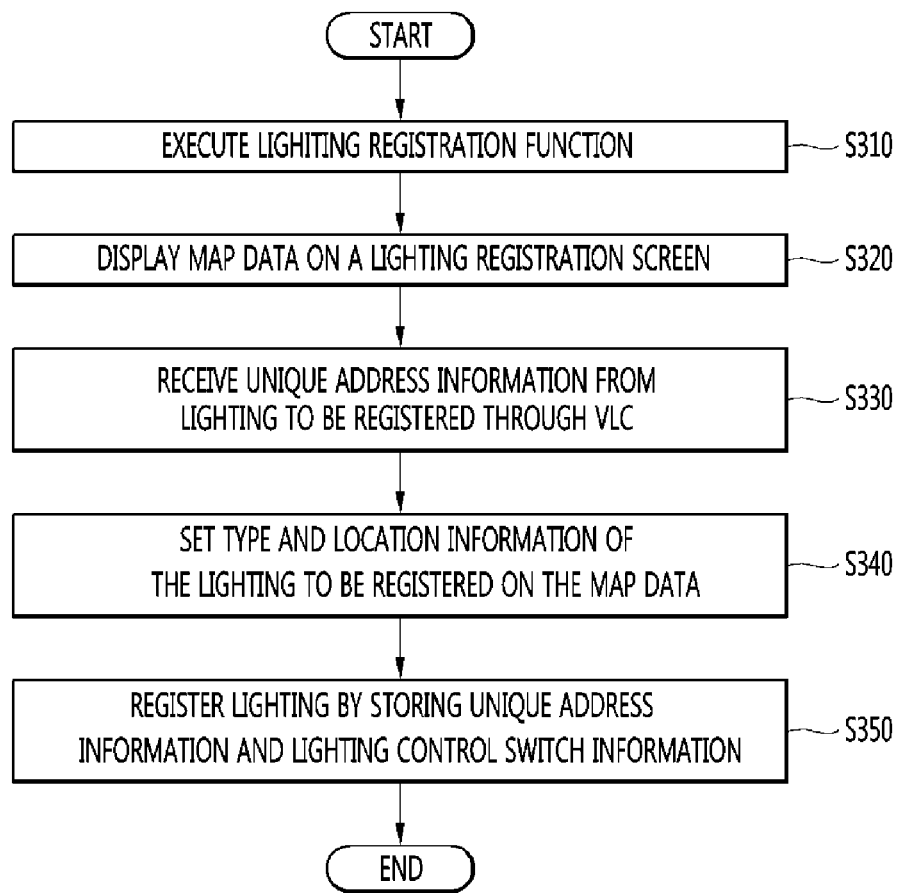
FIG. 11 is a flow chart to describe a light registration method according to a third exemplary embodiment of the present disclosure by steps.
Figure 15:
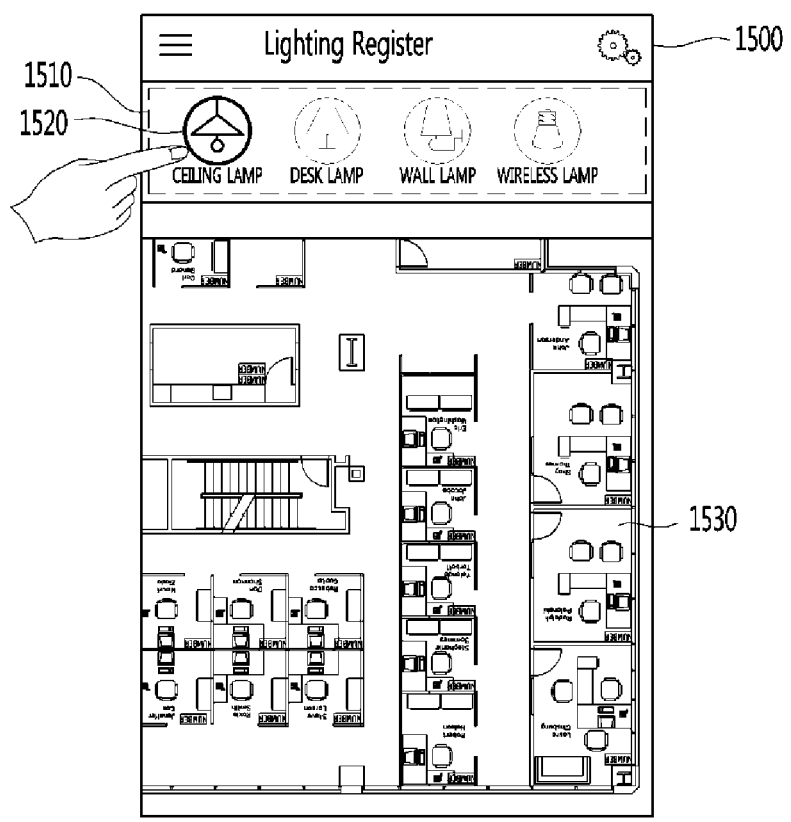
Figure 16:
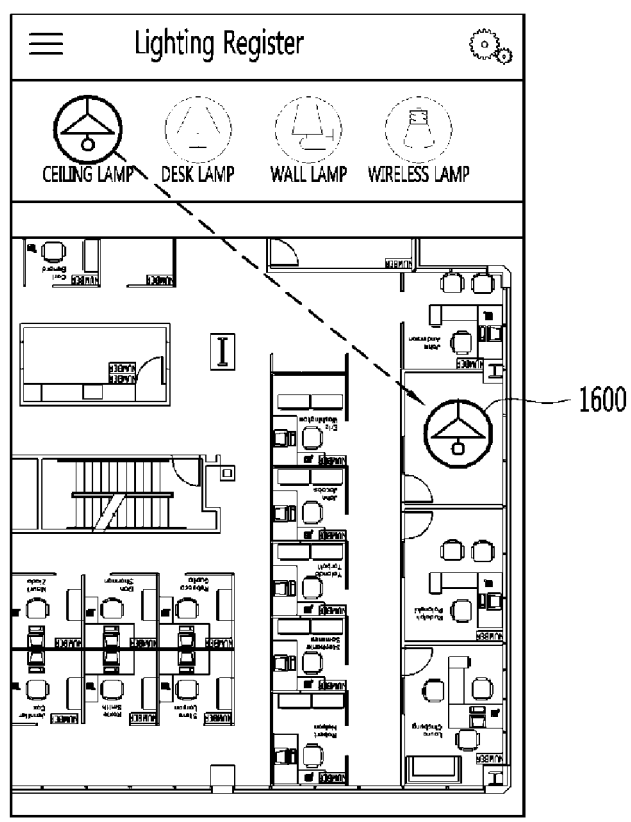
Figure 17:
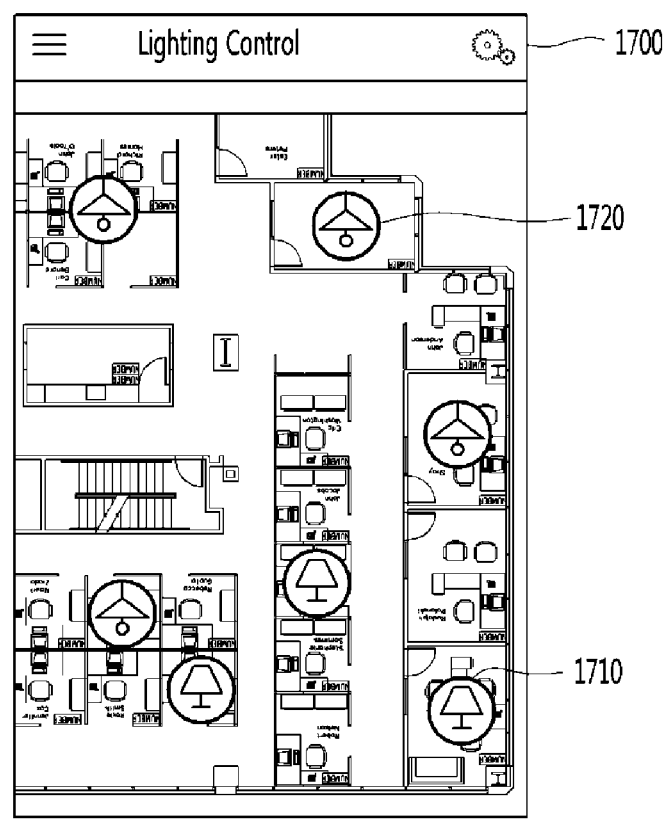
FIGS. 17 and 18 illustrate graphic user interfaces provided by the light control apparatus during the light registration according to the third exemplary embodiment.
Figure 18:
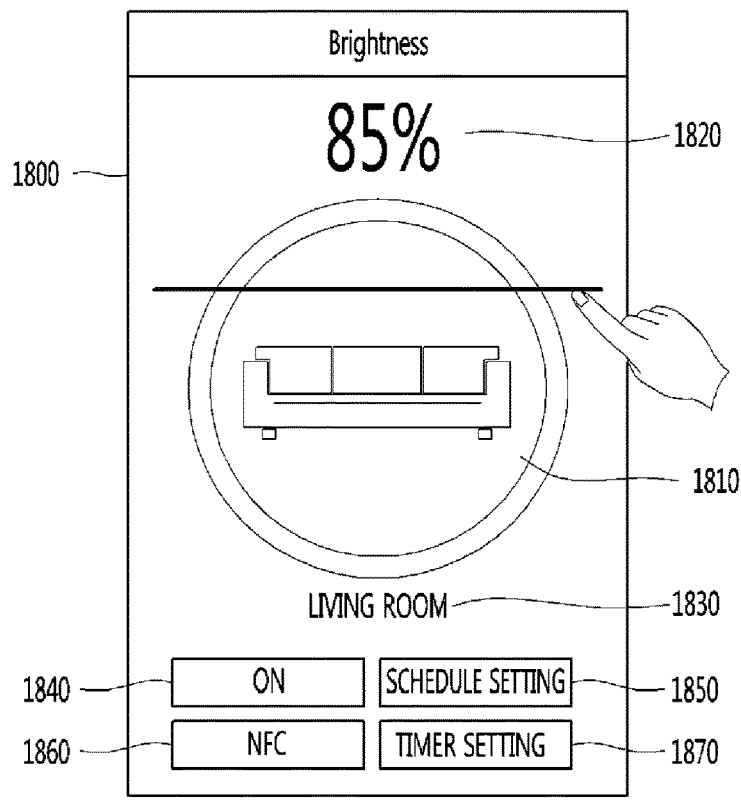

FIG. 11 is a flow chart to describe a light registration method according to a third exemplary embodiment of the present disclosure by steps, FIGS. 12 to 16 illustrate graphic user interfaces provided by the light control apparatus during the light registration according to the third exemplary embodiment, and FIGS. 17 and 18 illustrate graphic user interfaces provided by the light control apparatus during the light registration according to the third exemplary embodiment.

Figure 12:
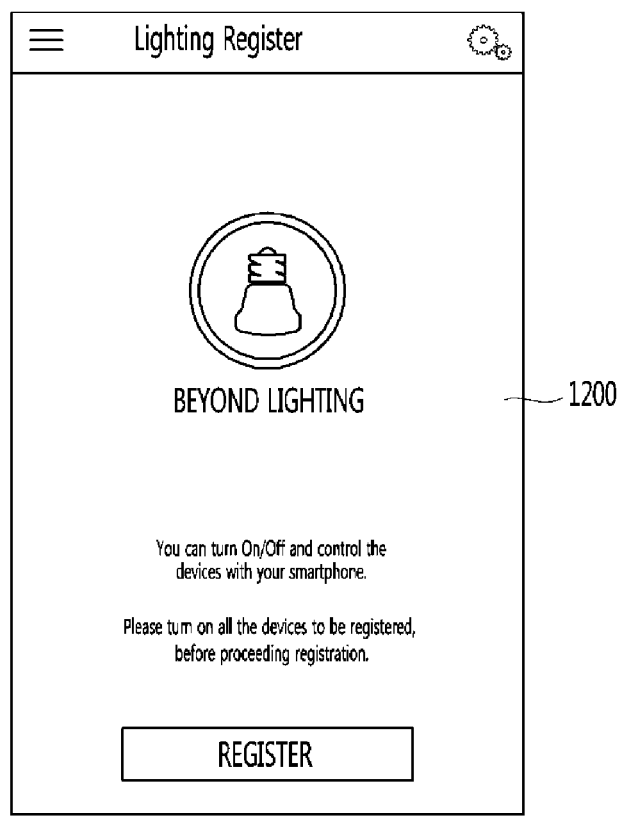
FIGS. 12 to 16 illustrate graphic user interfaces provided by the light control apparatus during the light registration according to the third exemplary embodiment.

Referring to FIG. 11, the lighting control apparatus (300) may execute a lighting registration function (S310). Upon execution of the lighting registration function, as illustrated in FIG. 12, the lighting control apparatus (300) may display a start screen (1200) for starting the registration process, with a message saying to turn on the lighting (100) to be registered.

Here, upon execution of the lighting registration function, the lighting control apparatus (300) may display preregistered map data. Here, the map data may be set by the user by the time when the lighting registration function is executed. Alternatively, the map data may have been preset in advance.

Hereinafter, an exemplary embodiment where the map data is set up while the map data has not been preset will be preferentially described. However, the present disclosure is not limited hereto. Therefore, the setup process of the map data may be omitted and the map data may be directly displayed, when the preset map data is present.

Successively, the lighting control apparatus (300) may display map data (S320). As described in the above, the map data may be displayed when the preregistered map data is present and a screen for registering the map data may be displayed when the preregistered map data is not present.

The lighting control apparatus (300) may display a registration screen for registering the map data on the lighting registration screen.

Figure 13:
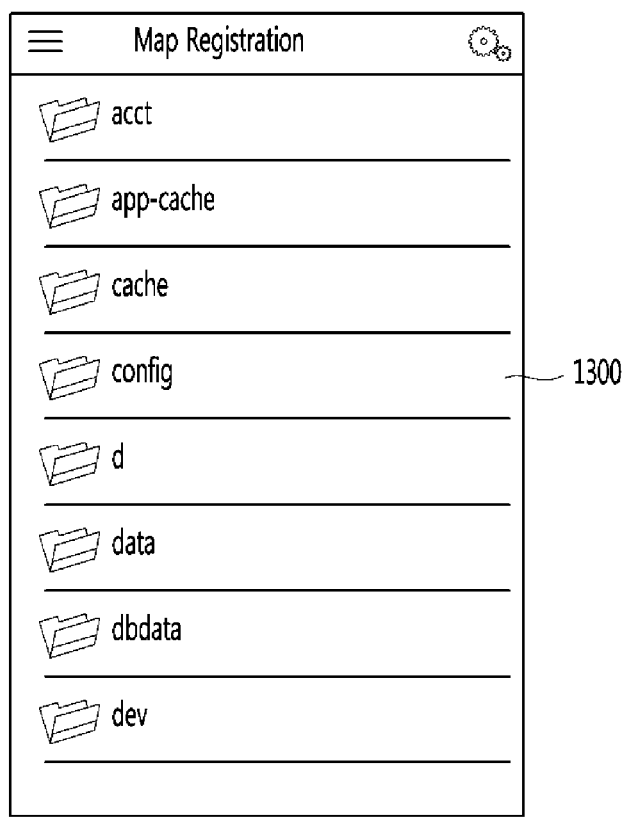

That is, referring to FIG. 13, the lighting control apparatus (300) may display a folder selection screen (1300) including information with respect to folders storing a variety of data.

The folder selection screen (1300) may display a plurality of folders present in the lighting control apparatus (300).

Here, the displayed folder may include a folder storing map data. In addition, the displayed folder may include a folder storing other data (for example, motion picture, picture, application data, etc.) than the map data.

Successively, the user may select a folder storing map data that the user desires to select on the folder selection screen (1300) displayed on the light control apparatus (300).

Figure 14:
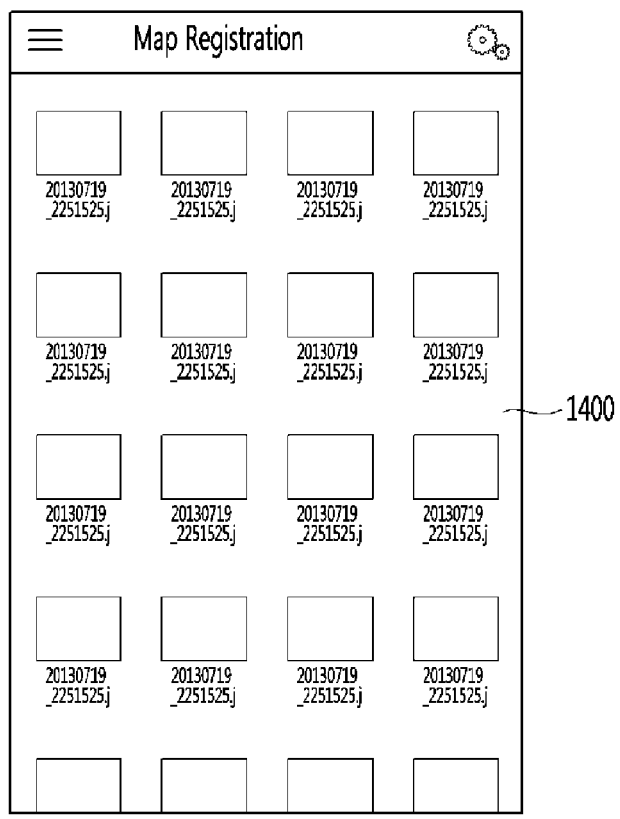

As illustrated in FIG. 14, upon selection of the folder, a list (1400) of at least one data item included in the selected folder may be displayed.

Successively, the user may select a particular piece of data to be registered as map data and may set up the map data.

When the map data is set up as described in the above, the lighting control apparatus (300) may display a screen for registration of the lighting (100) using the map data.

Referring to FIG. 15, the lighting registration screen (1500) may include a first domain (1510) displaying a plurality of lighting icons for selecting a type of the lighting to be registered, and a second domain (1530) displaying the set map data.

A plurality of lighting icons for selecting a type of the lighting to be registered may be displayed in the first domain (1510).

The lighting icon may include a first type icon representing a ceiling lamp, a second type icon representing a desk lamp, a third type icon representing a wall lamp, and a fourth type icon representing a wireless lamp.

Successively, the lighting control apparatus (300) may receive unique address information of the lighting through visible lighting communication with the lighting to be registered (S330).

Upon receipt of the unique address information, the lighting control apparatus (300) may set type and location information of the lighting in response to the unique address information (S340).

That is, referring to FIG. 15, the user may select the first type icon representing a ceiling light on the first domain (1510). Accordingly, the first type icon may be displayed as activated on the first domain (1510), and other type icons may be displayed as inactivated on the first domain (1510).

Successively, referring to FIG. 16, the user may touch the first type icon among a plurality of type icons displayed in the first domain (1510), and while keeping touching the first type icon, may drag the touched spot to the second domain (1530) displaying the map data.

Here, when the drag operation is performed, the selected first type icon may be moved along the dragged spot onto the second domain (1530) displaying the map data.

Successively, the user may drag the first type icon to a position where the lighting to be registered is installed in a real-space on the map data, and upon completion of the drag operation, may release the touch.

When the touch is released (drag and drop), the first type icon may be moved to the spot where the touch is released (1600).

Here, the lighting control apparatus (300) may set a real-space location of the spot to which the first type icon is moved on the map data as an installation location of the first lighting (100) to be registered.

In other words, the real-space location corresponding to the spot to which the first type icon is moved on the map data is set as the installation of the lighting.

Meanwhile, the map data may be CAD (Computer Aided Design) data as illustrated in the figure. Alternatively, the map data may be a photograph taken at the place where the lighting to be registered is installed in a real-space.

Successively, the lighting control apparatus (300) may register the unique address information received from the light to be registered and the real-space location corresponding to the spot to which the first type icon is moved on the map data as an installation location in real-space (S350).

As described in the above, according to a third exemplary embodiment, setting and registration of an installation location in a real-space may be performed by moving an icon (type icon) representing the lighting to be registered onto the map data.

Upon completion of the registration process of the lighting, the lighting control apparatus (300) may display a lighting control screen (1700) as illustrated in FIG. 17.

Map data may be displayed on the lighting control screen (1700), and the registered lighting icon may be arranged at a spot on the map data corresponding to the real-space location where the lighting is installed.

The lighting icon may include a first lighting icon (1710) representing a ceiling lamp and a second lighting icon (1720) representing a desk lamp.

The user may select a particular icon for a particular lighting to be controlled on the lighting control screen (1700).

Here, the lighting control apparatus (300) may control operation of the lighting corresponding to the selected icon, based on selection of the icon. For example, when the current operational status of the lighting corresponding to the selected icon is 'ON', the lighting control apparatus (300) may change the operational status of the lighting into 'OFF' based on selection of the icon. In a reverse way, when the current operational status of the lighting corresponding to the selected icon is 'OFF', the lighting control apparatus (300) may change the operational status of the lighting into 'ON' based on selection of the icon.

In addition, although it is illustrated herein that the lighting icons displayed on the lighting control screen (1700) are all having the same display condition, each of the lighting icons may be displayed as having different display condition according to its operational status.

For example, the icon corresponding to the light that is currently in 'OFF' status may be displayed as "inactivated" or in a condition of low brightness (for example, a level 0-100 among a 0-255 bright level). In addition, the icon corresponding to the light currently in 'ON' status may be displayed as activated or in a condition of high brightness (for example, a level 200-250 among a 0-255 bright level).

Alternatively, upon selection of the particular lighting icon, a detailed condition setting screen (1800) for configuring detailed conditions of the lighting corresponding to the selected lighting icon may be displayed, as illustrated in FIG. 18.

Here, the selection of the lighting icon may be implemented by methods of a short one touch, a short double touch, and a long touch. Different screens maybe displayed according to the conditions of touch.

For example, when the lighting icon is selected by a short one touch, the lighting control apparatus (300) may simply change operational status of the relevant lighting from 'ON' status to 'OFF' status, or from 'OFF' status to 'ON' status.

In addition, when the lighting icon is selected by a short double touch or a long touch, the lighting control apparatus (300) may display the detailed condition setting screen (1800).

Referring to FIG. 18, the detailed condition setting screen (1800) may include a brightness level setting area (1810) for setting brightness level, a brightness level display area (1820) displaying the currently selected brightness level, a lighting information display area (1830) displaying information of the currently selected lighting, a power control area (1840) for controlling power of the currently selected lighting, a schedule setting area (1850) for setting schedule of the currently selected lighting, an NFC (Near Field Communication) area (1860) for turning ON/OFF an NFC function of the currently selected lighting, and a timer setting area (1870) for setting a timer of the currently selected lighting.

The brightness level setting area (1810) may set a brightness level of the currently selected lighting. Here, information with respect to the currently selected lighting may be displayed on the lighting information display area (1830).

Here, the information of the lighting displayed on the lighting information display area (1830) may be information with respect to a lighting group including a plurality of lightings. Alternatively, the information of the lighting displayed on the lighting information display area (1830) may be information with respect to a particular lighting included in a particular lighting group.

That is, the brightness level setting area (1810) may be an area for collectively setting brightness level of a plurality of lightings included in a particular lighting group. Alternatively, the brightness level setting area (1810) may be an area for individually setting brightness level of a particular lighting included in a particular lighting group.

The brightness level setting area (1810) may be provided in a form of a brightness control gauge. The user may touch the brightness control gauge and move upward or downward while keep touching, thereby to control the brightness level.

In addition, as the brightness level is set, the status of the brightness control gauge of the brightness level setting area (1810) may be changed. That is, an upper area based on a spot to which the brightness level control gauge is moved may be displayed in grey color, and a lower area based on a spot to which the brightness level control gauge is moved may be displayed in other colors (for example, in blue color). Here, the color of the lower area may be corresponding to a color emitted from the relevant lighting. For example, when the light emitted from the relevant lighting is in red color, the lower area of the brightness control gauge may be filled in red color.

Accordingly, the user may readily configure brightness level of the lighting using the brightness control gauge, as well as may readily ascertain the currently set brightness level.

In addition, the user may configure the brightness level by moving the brightness control gauge of the brightness level setting area (1810) upwardly or downwardly. Alternatively, the lighting control apparatus (300) may additionally display an input number window for the user to directly input brightness level, as the brightness level setting area (1810) is touched by a long touch or by a short double touch. Therefore, the user may set brightness level of the lighting by inputting a number corresponding to the brightness level that the user desires to set.

Information on the brightness level set through the brightness level setting area (1810) may be displayed on the brightness level display area (1820).

Information on the currently selected lighting may be displayed on the lighting information display area (1830). That is, information with respect to the particular lighting to which the operational conditions set through the display screen will be applied may be displayed on the lighting information display area (1830).

The power control area (1840) may be provided in order to control electric power of the currently selected lighting. The user may change power status of the particular lighting using the menu displayed on the power control area (1840).

A menu for setting schedule of the currently selected lighting may be displayed on the schedule setting area (1850). The schedule setting means presetting power status or brightness level of the lighting by time period. Operational status of the relevant lighting may be automatically changed according to the set schedule.

An ON/OFF menu for turning ON/OFF wireless communication function (for example, NFC function) of the currently selected lighting may be displayed on the NFC area (1860). The user may turn on wireless communication function of the relevant lighting. Otherwise, the user may turn off wireless communication function of the relevant lighting.

A menu for setting timer of the currently selected lighting may be displayed on the timer setting area (1870).

Meanwhile, operational status information, on whether a preset schedule for the relevant lighting is present or whether a timer is present, may be displayed on the detailed condition setting screen (1800).

In addition, additional information such as MAC address of the relevant address, firmware version, current dimming status, and number of lightings in the lighting group including the lighting, may be displayed on the detailed condition setting screen (1800).

Hereinafter, a process to link information for providing data service with the registered lighting (100) will be described in detail.

Figure 19:
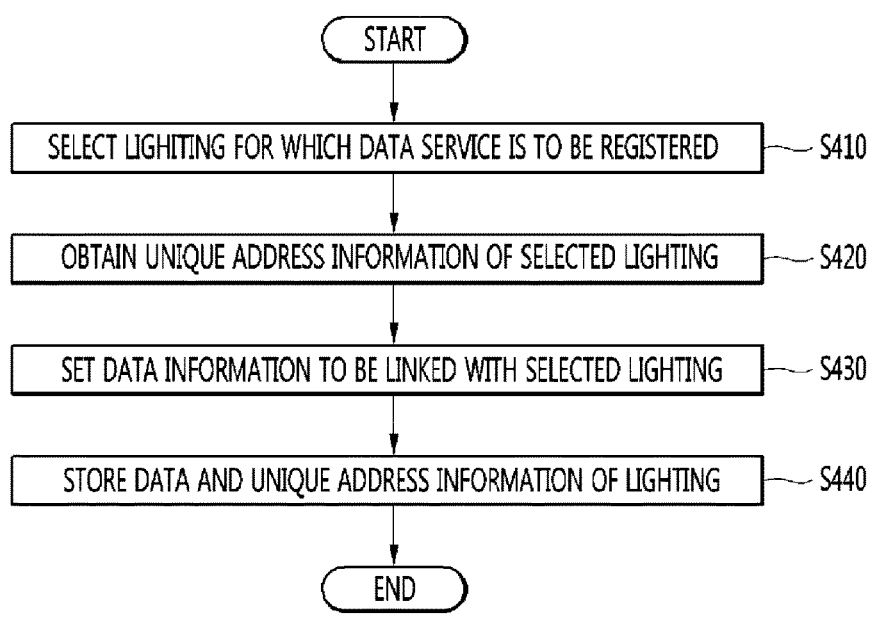
FIG. 19 is a flow chart to describe a data service setting method according to an exemplary embodiment of the present disclosure by steps.
Figure 20:
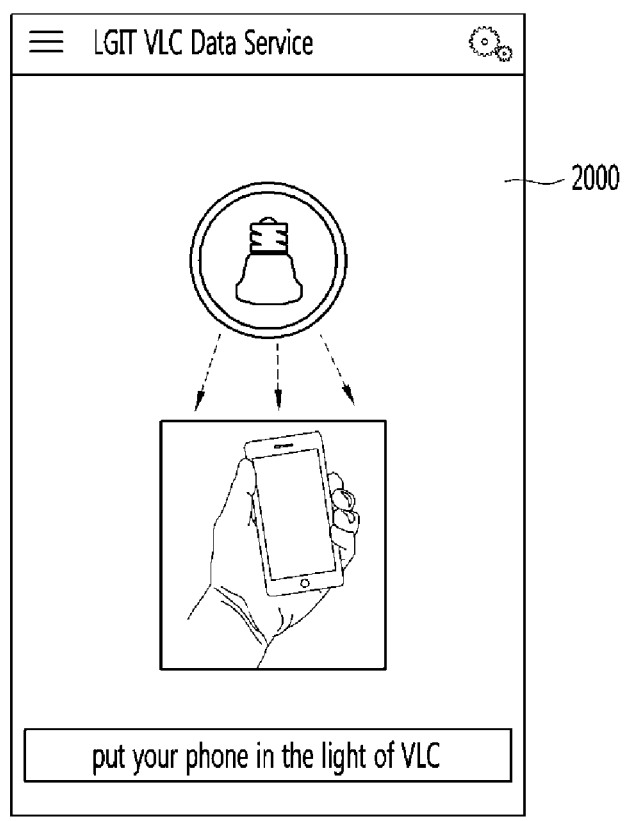
FIGS. 20 to 22 are graphic user interfaces illustrating data service setting process according to an exemplary embodiment of the present disclosure.
Figure 21:
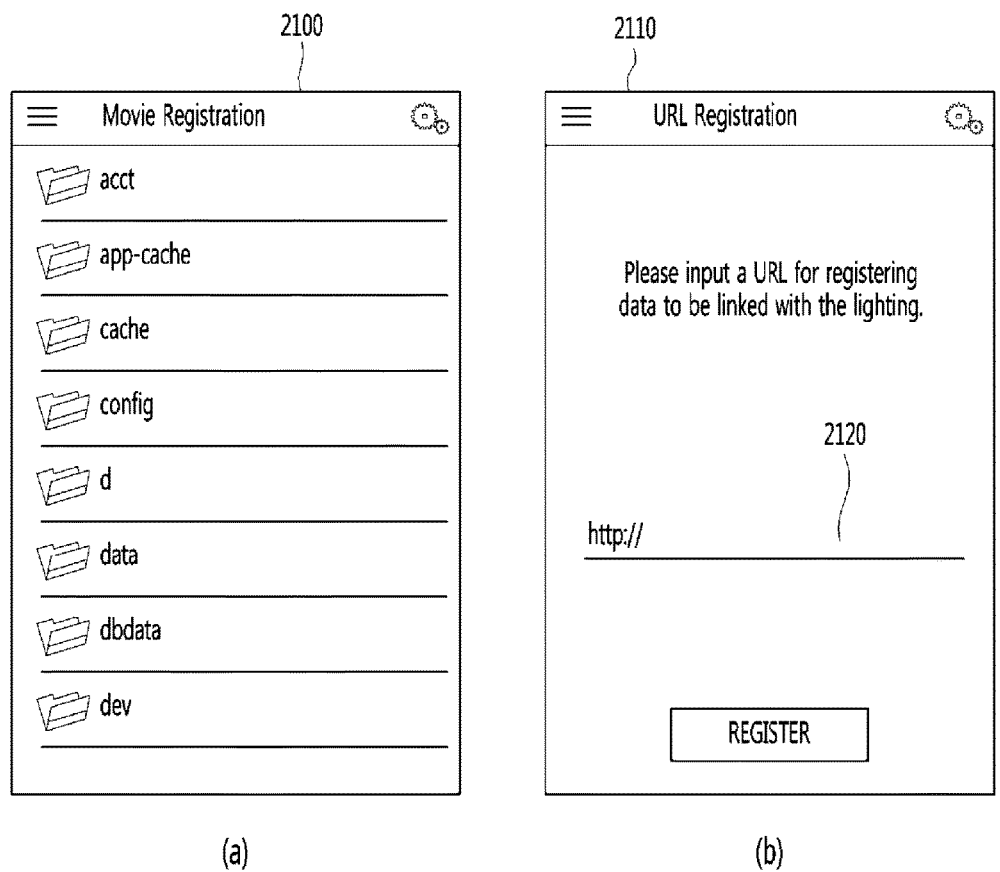
Figure 22:
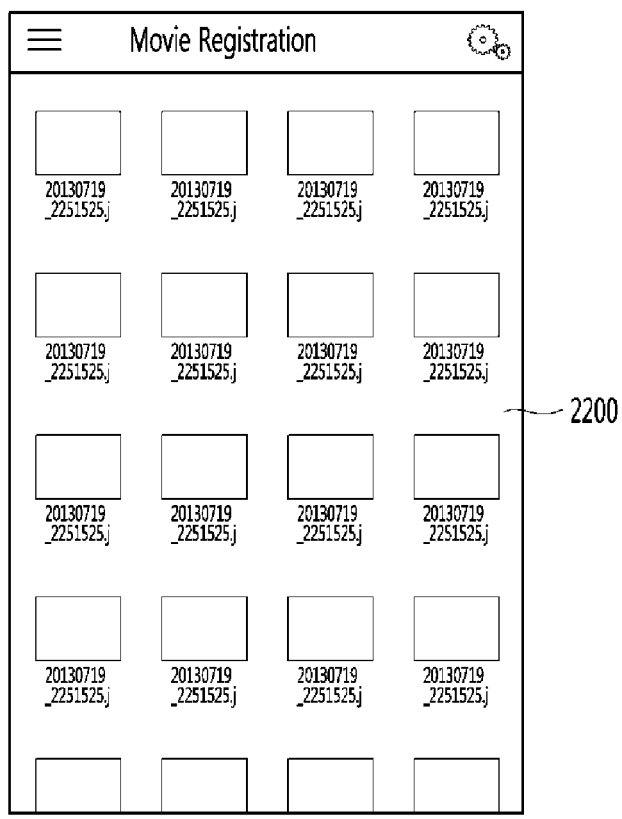

FIG. 19 is a flow chart to describe a data service setting method according to an exemplary embodiment of the present disclosure by steps, and FIGS. 20 to 22 are graphic user interfaces illustrating data service setting process according to an exemplary embodiment of the present disclosure.

Referring to FIG. 19, the lighting control apparatus (300) may select a lighting for which data service is registered (S410).

The lighting selection process may be performed by displaying a list of registered lightings and selecting a particular lighting from the displayed list.

Alternatively, the lighting selection process may be performed by moving to the location where the lighting to be selected is installed and thereby receiving unique address information transmitted from the lighting to be selected through visible lighting communication.

Successively, the lighting control apparatus (300) may obtain unique address information of the selected lighting (100) (S420).

As described in the above, the obtaining of unique address information may be performed by detecting unique address information of the selected lighting among the registered lightings. Alternatively, the obtaining of unique address information may be performed by receiving unique address information transmitted directly from the lighting to be selected through the visible lighting communication.

To this end, referring to FIG. 20, the lighting control apparatus (300) may display a screen (2000) for obtaining unique address information of the lighting (100), and thereby obtain unique address of the lighting (100).

Successively, upon obtainment of the unique address information, the lighting control apparatus (300) may set data information to be set for the obtained unique address information (S430).

FIG. 21 illustrates a method to register linked data according to an exemplary embodiment.

To this end, referring to FIG. 21(*a*), the lighting control apparatus (300) may include a folder selection screen (2100) including information of folders storing various data.

A plurality of folders present in the lighting control apparatus (300) may be displayed on the folder selection screen (2100).

Here, the displayed folder may include a folder storing motion picture, pictures, and text information for providing data service. Alternatively, the displayed folder may include a folder storing other data (for example, map data, application data, etc.).

Successively, the user may select a particular folder storing data that the user desires to set up on the folder selection screen (2100) displayed on the lighting control apparatus (300).

Alternatively, referring to FIG. 21(*b*), the user may input a URL (Uniform Resource Locator) to register data to be linked, rather than the selection of data in the folder.

To this end, a URL registration screen (2110) may be displayed.

The URL registration screen (2110) may include an input window (2120) for inputting the URL. The data to be linked may be set by inputting a URL including the data to be linked with the lighting in the input window (2120).

Meanwhile, when the folder is selected on the folder selection screen (2100), a list (2200) of at least one piece of data included in the selected folder may be displayed as illustrated in FIG. 22.

Successively, the user may select a piece of data from the list (2200). The selected piece of data may be registered as the data to be linked.

Here, the selected piece of data may be contents such as motion pictures. Alternatively, the selected piece of data may be a picture or text.

Alternatively, the selected piece of data may be download information for accessing a particular server through visible lighting communication, downloading particular data, and for displaying the downloaded data.

Figure 23:
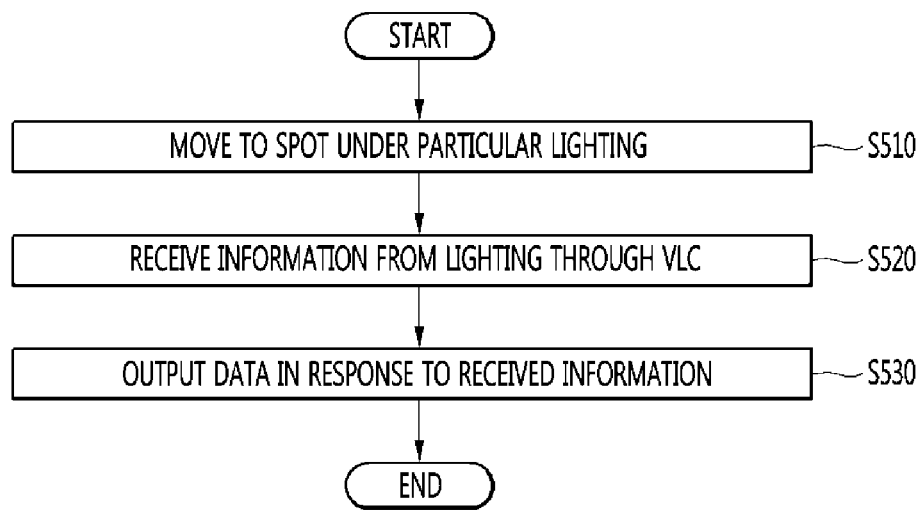
FIG. 23 is a flow chart to describe a data service execution method according to an exemplary embodiment of the present disclosure by steps.
Figure 24:
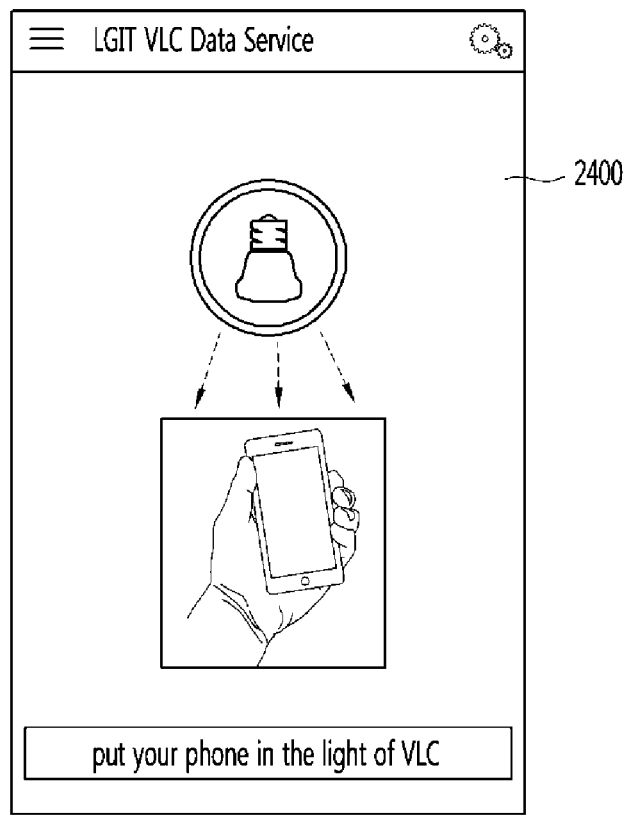
FIGS. 24 to 26 are graphic user interfaces illustrating data service setting process according to an exemplary embodiment of the present disclosure.
Figure 25:
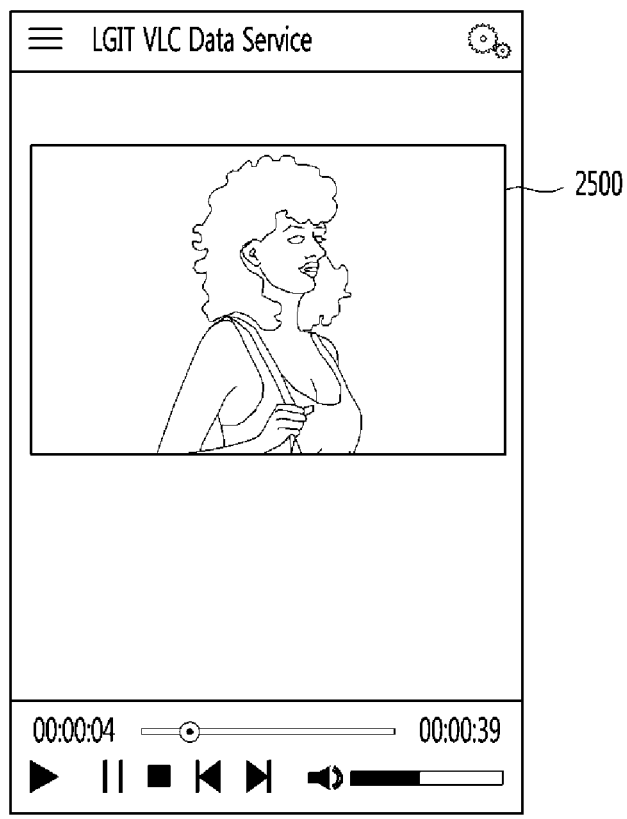
Figure 26:
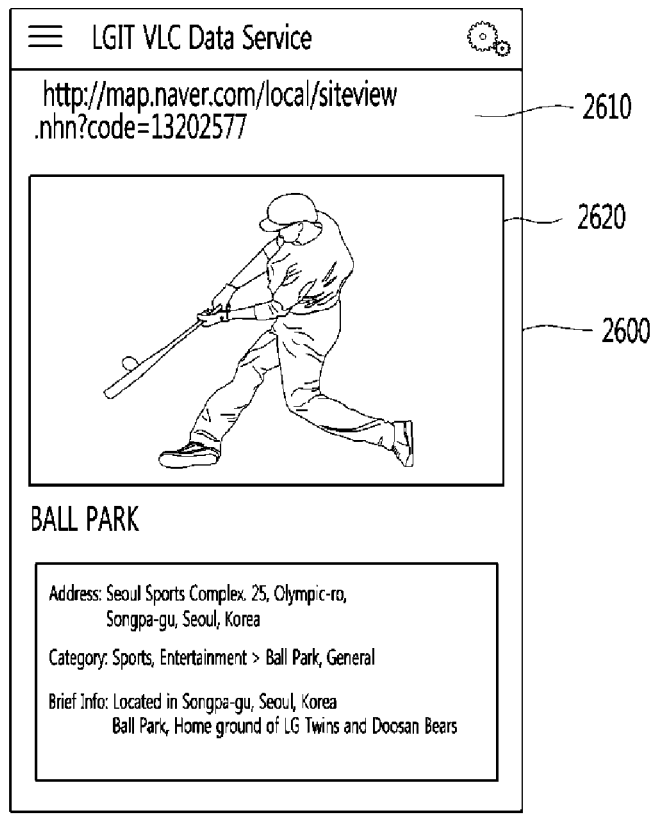

FIG. 23 is a flow chart to describe a data service execution method according to an exemplary embodiment of the present disclosure by steps, and FIGS. 24 to 26 are graphic user interfaces illustrating data service setting process according to an exemplary embodiment of the present disclosure.

Referring to FIG. 23, the lighting control apparatus (300) may be moved to a location where a particular lighting for which data service is to be executed is installed (S510).

Successively, the lighting control apparatus (300) may receive information provided through visible lighting communication from the lighting installed at the location to which the lighting control apparatus (300) is moved (S520).

Successively, the lighting control apparatus (300) may output data linked in response to the received information (S530).

To this end, referring to FIG. 24, the lighting control apparatus (300) may perform visible lighting communication with the lighting (100) for which the data service is to be executed. Accordingly, the lighting control apparatus (300) may display a screen (2400) for obtaining particular information, and may receive information transmitted through visible lighting communication from the lighting (100).

Here, the transmitted information may be link information itself, such as location information of particular data set to be linked with the lighting, URL information, and download information. Alternatively, the transmitted information may be unique address information.

The lighting control apparatus (300) may output particular data using the link information, when the transmitted information is link information itself.

Otherwise, when the transmitted information is unique address information, the lighting control apparatus (300) may extract data linked in response to the unique address information from the server, and output particular information using the extracted data information.

As illustrated in FIG. 25, the lighting control apparatus (300) may output a data output screen (2500) including the liked motion picture, when the data linked in response to the lighting is motion picture.

That is, the data linked in response to the lighting (that is, motion picture) may be outputted on the data output screen (2500), as illustrated in FIG. 25.

Here, a progress bar showing playback information of the outputted motion picture may be displayed at a lower end of the data output screen (2500).

The progress bar may include playback information such as total length of the outputted motion picture, information of current played position, etc.

In addition, as illustrated in FIG. 26, the lighting control apparatus (300) may output a data output screen (2600) including the liked URL information (2610) and data information (2620) provided in response to access to the URL, when the data linked in response to the lighting is URL information.

The data service as described in the above may be advantageously used in places such as museums and huge stores.

That is, a manager of such place may link the lightings installed at every corner of the museum or store with information additionally describing artworks or products present at the relevant corner.

The user may readily ascertain descriptions of the artworks or products present at the relevant corner, by entering the particular corner of the museum or store and receiving information in response to the linked data from the lightings installed at the corner. Otherwise, the user may readily watch advertisements.

In addition, the lighting control apparatus (300), upon receipt of unique address information from the lighting for which the data service is executed, may receive link data set in response to the unique address information from the server providing the visible lighting communication, and may output the received link data.

Here, the link data may be updated in real time, such that particular advertisement or data can be outputted from the server in real time.

In addition, the lighting control apparatus (300) may receive the data linked in response to the lighting in linkage with Li-Fi (Light Fidelity), and thereby output the received data.

Hereinafter, a process to check status of visible lighting communication with the registered lightings will be described.

Figure 27:
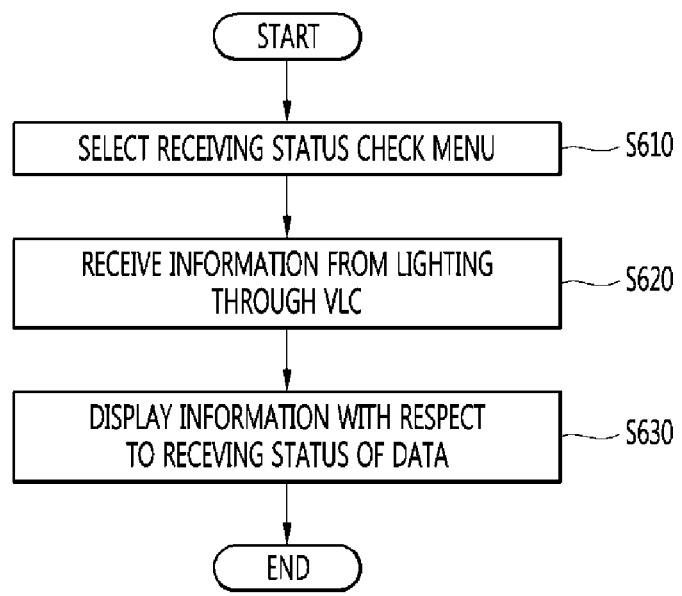
FIG. 27 is a flow chart to describe a checking method of visible light communication status according to an exemplary embodiment of the present disclosure by steps.
Figure 28:
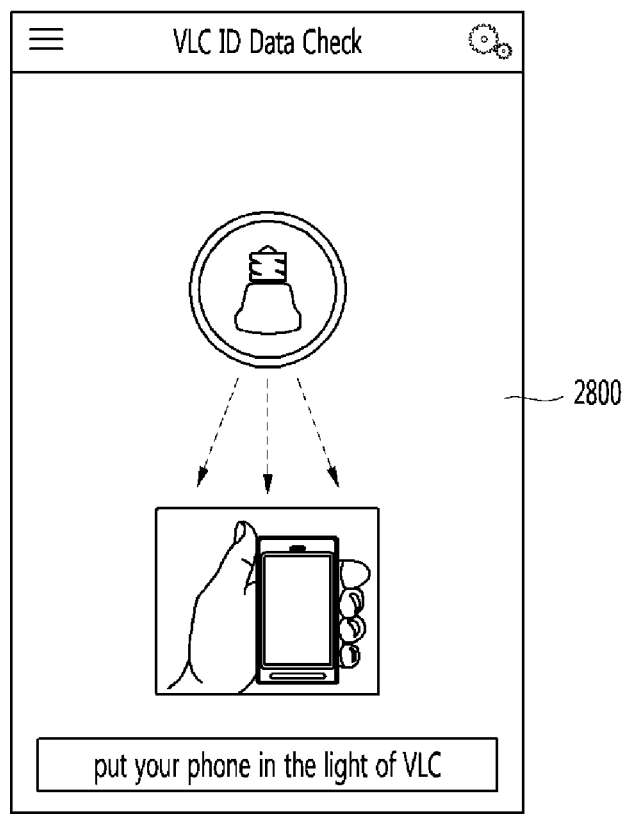
FIGS. 28 and 29 are graphic user interfaces illustrating a checking method of visible light communication status according to an exemplary embodiment of the present disclosure.
Figure 29:
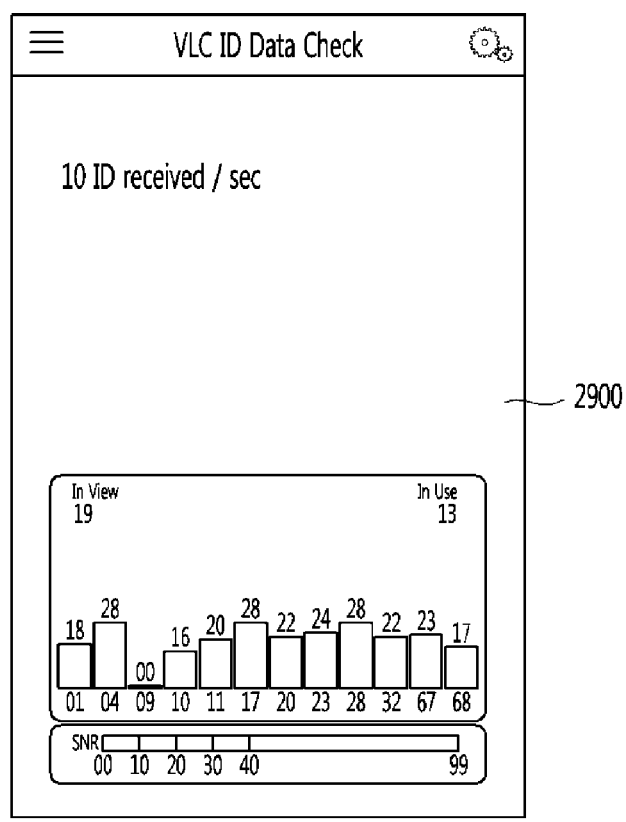

FIG. 27 is a flow chart to describe a checking method of visible light communication status according to an exemplary embodiment of the present disclosure by steps, and FIGS. 28 and 29 are graphic user interfaces illustrating a checking method of visible light communication status according to an exemplary embodiment of the present disclosure.

Referring to FIG. 27, upon selection of a receiving status check menu on the VLC service selection screen (S610), the lighting control apparatus (300) may receive data transmitted through visible lighting communication from the lightings (S620).

Successively, the lighting control apparatus (300) may display a receiving status screen including receiving status information (S630).

Referring to FIG. 28, the lighting control apparatus (300) may perform visible lighting communication with the lighting (100) in order to check the receiving status, display a screen (2800) for receiving information transmitted through the visible lighting communication, and thereby receive information transmitted through the visible lighting communication form the lighting (100).

In addition, referring to FIG. 29, the lighting control apparatus (300) may receive information transmitted through the visible lighting communication form the lighting (100), analyze the received information, and thereby display a receiving status screen (2900) showing receiving status information in response to the analyzed information.

Here, the information transmitted form the lighting (100) to the lighting control apparatus (300) for the receiving status check may be unique address information of the lighting (100). Alternatively, the information transmitted form the lighting (100) to the lighting control apparatus (300) for the receiving status check may be URL information set for the data service linkage.

The receiving status screen (2900) may display number of data pieces received among data transmitted from the lighting (100). It is illustrated in FIG. 29 that the number of received data piece is 10. Here, FIG. 29 shows that the current receiving status is of 33% reception rate, in a situation where 30 pieces of data (more particularly, ID) per second are transmitted from the lighting (100) and 10 pieces of data per second are received.

In addition, information displayed on an upper box may include x-axis information representing types of data and y-axis information representing number of receptions for each type of data.

Hereinafter, a process to provide current location and moving route of the user according to location of the lighting will be described in detail.

Figure 30:
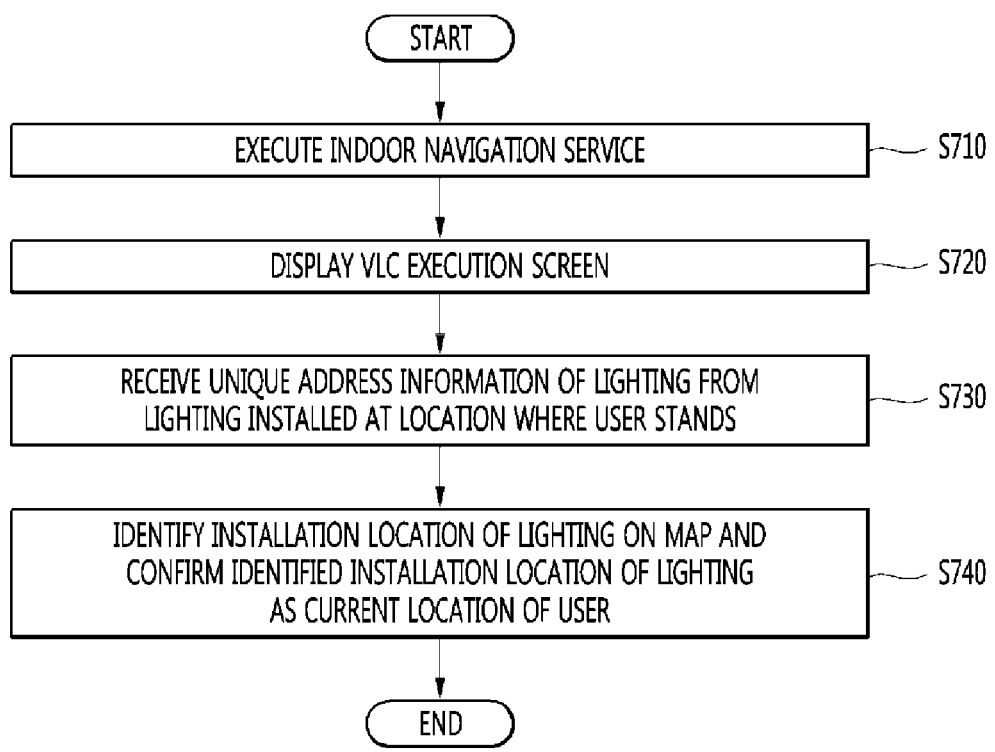
FIG. 30 is a flow chart illustrating a method to provide current location of a user according to an exemplary embodiment of the present disclosure.
Figure 31:
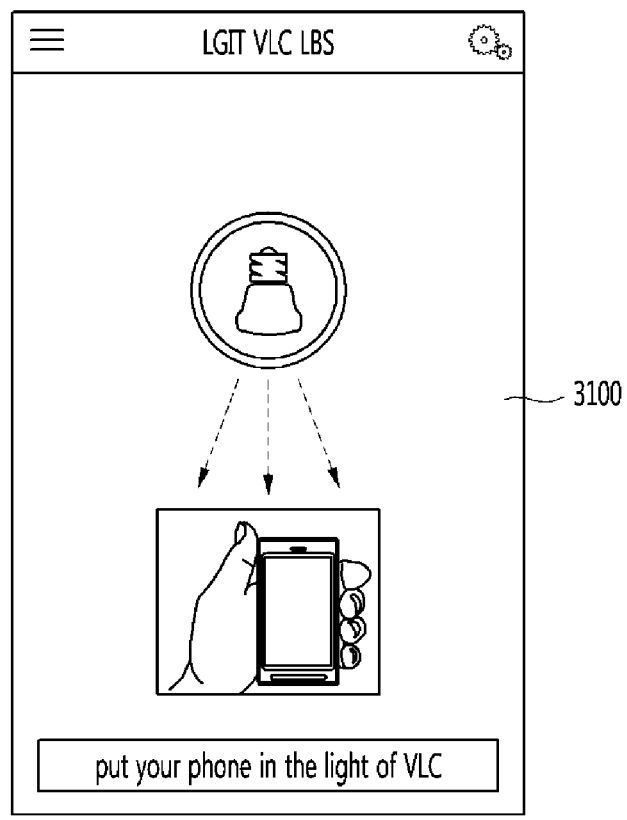
FIGS. 31 and 32 illustrate graphic user interfaces to provide current location of a user according to an exemplary embodiment of the present disclosure.
Figure 32:
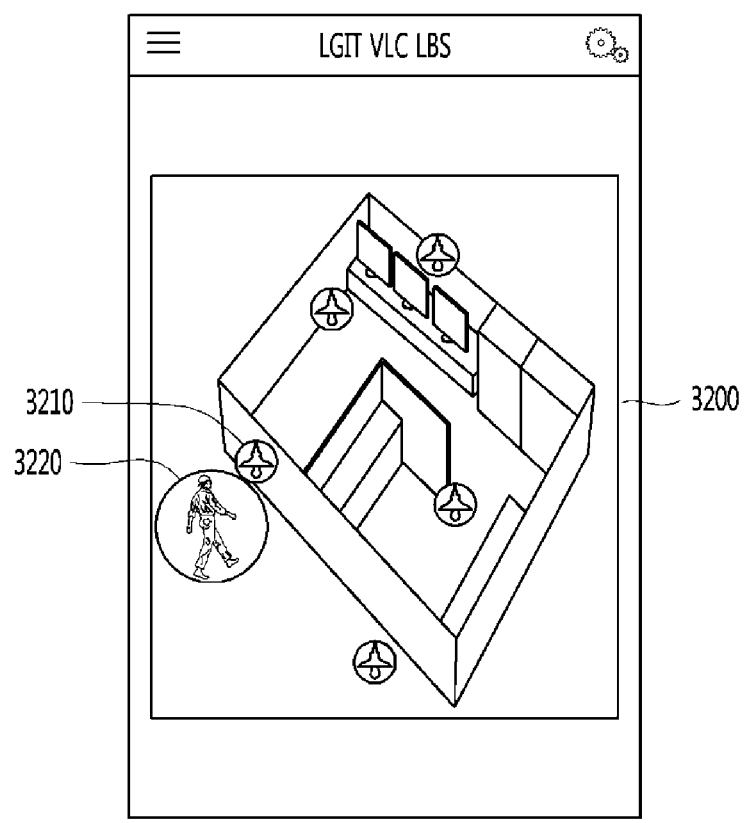

FIG. 30 is a flow chart illustrating a method to provide current location of a user according to an exemplary embodiment of the present disclosure, and FIGS. 31 and 32 illustrate graphic user interfaces to provide current location of a user according to an exemplary embodiment of the present disclosure.

Referring to FIG. 30, upon execution of indoor navigation service (S710), the lighting control apparatus (300) may display a VLC execution screen (S720).

As illustrated in FIG. 31, the VLC execution screen (3100) may be provided in order to perform visible lighting communication with the lighting installed at a location where the user is present, and to receive unique address information from the lighting.

Successively, the lighting control apparatus (300) may perform visible lighting communication with the lighting installed at the location where the user is present, and receive unique address information of the lighting (S730).

Successively, the lighting control apparatus (300) may display map data including a location where the lighting that has transmitted the unique address information is installed, and the location where the lighting is installed. Here, the lighting control apparatus (300) may display a location information screen including information showing that the installation location of the lighting is the current location of the user on the map (S740).

That is, as illustrated in FIG. 32, the location information screen (3200) may include map data.

In addition, at least one lighting icon identifying lightings installed at the relevant positions may be displayed on the map data.

Here, in a case where the user is present at a location where a first lighting icon (3210) is installed and the unique address information transmitted from the lighting corresponding to the first lighting icon (3210) is received, the location where the lighting is installed may be displayed as the current location information (3220) of the user.

Thereby, the user may readily ascertain on the map the current location of himself (or herself) in real-space.

Figure 33:
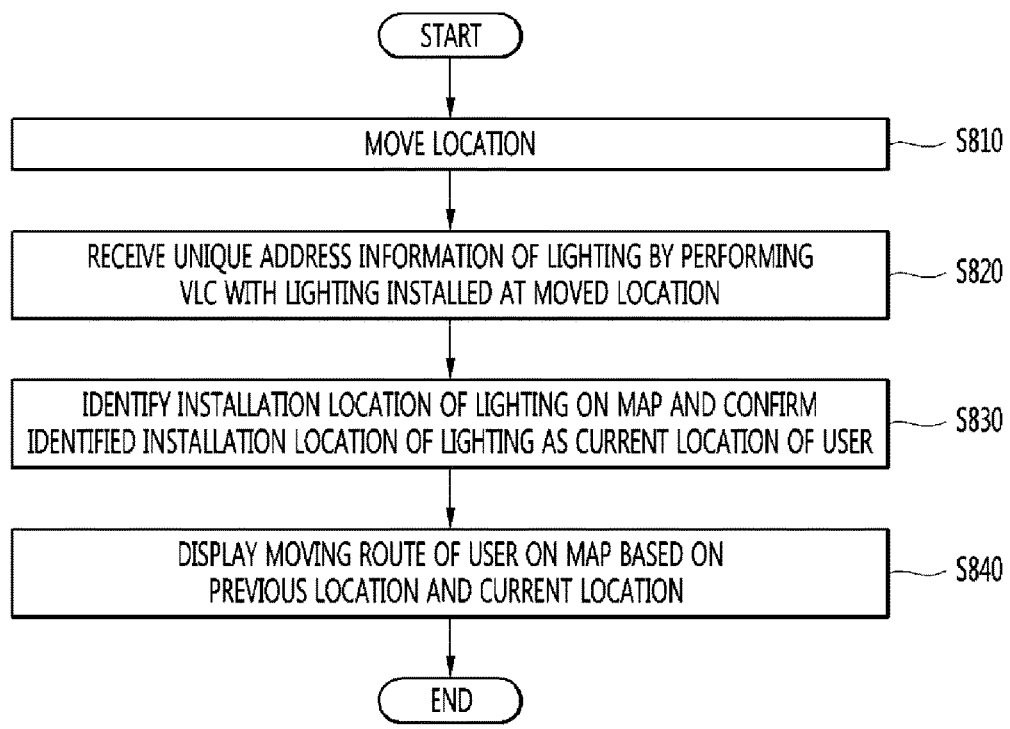
FIG. 33 is a flow chart illustrating a method to provide a moving route of a user according to an exemplary embodiment of the present disclosure.
Figure 34:
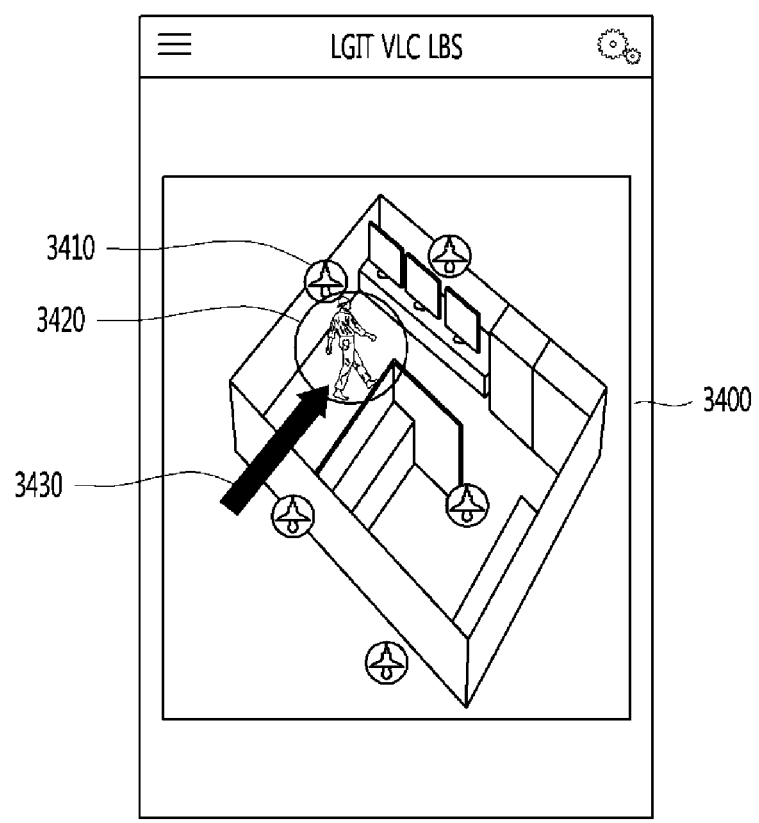
FIG. 34 illustrates a graphic user interfaces to provide a moving route of a user according to an exemplary embodiment of the present disclosure.

FIG. 33 is a flow chart illustrating a method to provide a moving route of a user according to an exemplary embodiment of the present disclosure, and FIG. 34 illustrates a graphic user interfaces to provide a moving route of a user according to an exemplary embodiment of the present disclosure.

Referring to FIG. 33, the lighting control apparatus (300) may be moved (the user possessing the lighting control apparatus may move) (S810), and may receive unique address information transmitted from the lighting by performing visible lighting communication with the lighting installed at the location to which the lighting control apparatus (300) is moved (S820).

The lighting control apparatus (300) may identify installation location of the lighting on the map data, and thereby confirm the identified installation location of lighting as a current location of the user (S830).

Here, the lighting control apparatus (300) may display information on moving route of the user on the map data, based on the previously identified location of the user and the currently identified location of the user (S840).

That is, referring to FIG. 34, a lighting icon (3410) representing the lighting installed at the location to which the user moves, information on moved location of the user (3420) identified through the lighting corresponding to the lighting icon (3410), and information on moving route of the user (3430) based on the previous location of the user may be displayed on a moving route information screen (3400).

Figure 35:
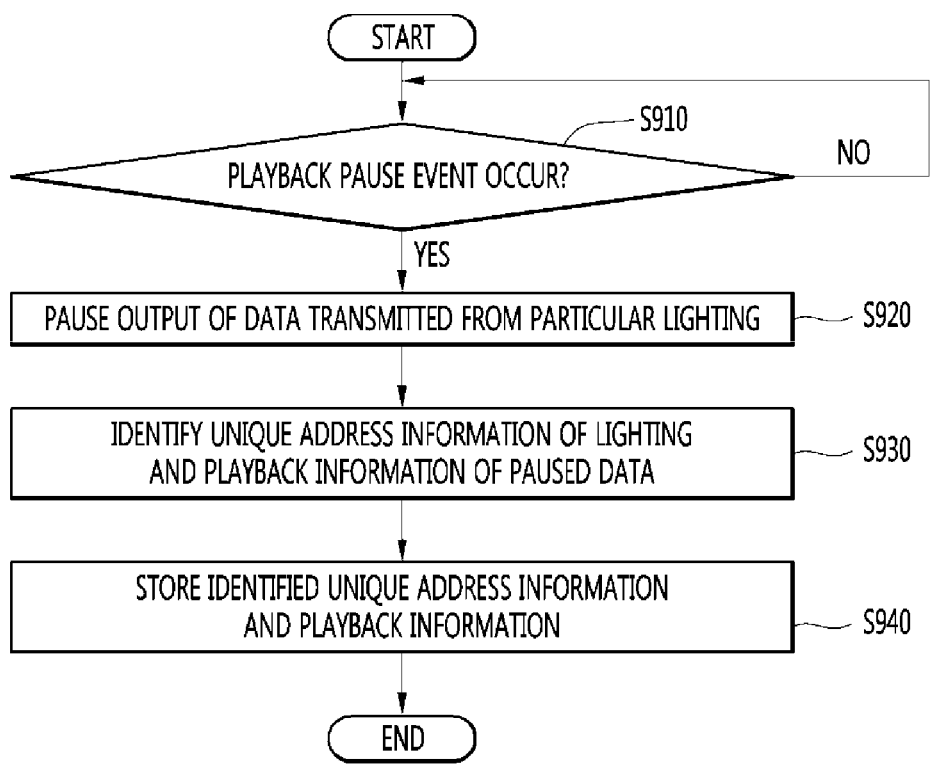
FIG. 35 is a flow chart describing a method to pause data service according to an exemplary embodiment of the present disclosure by steps.

FIG. 35 is a flow chart describing a method to pause data service according to an exemplary embodiment of the present disclosure by steps.

As described in FIGS. 23 through 26 in the above, the lighting control apparatus (300) may be moved to a location where a particular lighting is installed, thereby receive data linked with the particular lighting, and output the received data.

Here, the lighting control apparatus (300) may determine whether a playback pause event occurs (S910). In other words, the lighting control apparatus (300) may determine whether the playback operation should be paused during the playback operation of the motion picture corresponding to the data linked with the particular lighting.

Here, the playback pause event may be generated by a playback pause command inputted directly by the user. Alternatively, the lighting control apparatus (300) may directly detect the playback pause event, without the playback pause command of the user.

That is, the lighting control apparatus (300) may detect a playback pause event, such as position change of the user from one installation location of a particular lighting providing data service to another installation location of another lighting, and interruption of connection (disconnection) of data communication with a particular lighting or server.

Successively, upon detection of non-occurrence of the playback pause event, the lighting control apparatus (300) may continuously play the motion picture. Otherwise, upon detection of occurrence of the playback pause event, the lighting control apparatus (300) may pause playback of the motion picture (S920).

Successively, the lighting control apparatus (300) may identify unique address information of the lighting that has been providing the data service, and playback information at time point when the playback pause event occurred (S930). Here, the playback information may be information on the time point when the playback was paused in a whole playback section of the motion picture.

In addition, the lighting control apparatus (300) may store the identified unique address information of the lighting where the playback pause event occurred and the relevant playback history information (S940). Here, the playback history information may be information on the time point when the playback was paused in a whole playback section of the motion picture.

Figure 36:
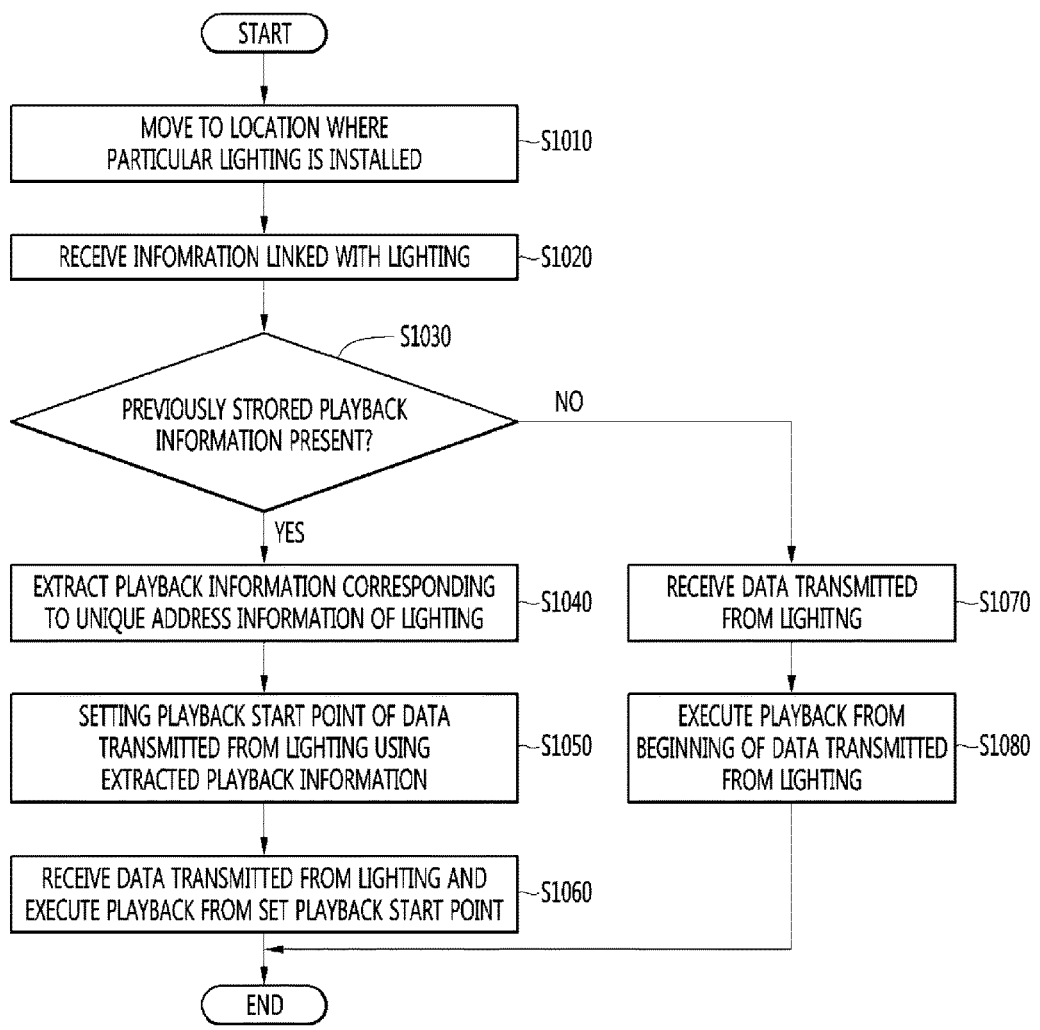
FIG. 36 is a flow chart describing a method to restart data service according to an exemplary embodiment of the present disclosure by steps.

FIG. 36 is a flow chart describing a method to restart data service according to an exemplary embodiment of the present disclosure by steps.

The method to restart the data service is similar to the previously described method of FIG. 23. One difference is in that the lighting control apparatus (300) may determine whether a playback pause event has previously occurred in the lighting for which the data service is to be executed.

That is, upon determining that a playback pause event has not previously occurred in the lighting for which the data service is to be executed, the lighting control apparatus (300) execute the data service as illustrated in FIG. 23.

Otherwise, upon determining that a playback pause event has previously occurred in the lighting for which the data service is to be executed, the lighting control apparatus (300) execute the data service as illustrated in FIG. 36.

Referring to FIG. 36, the lighting control apparatus (300) may be moved to a location where a particular lighting for which data service is to be executed is installed (S1010).

Successively, the lighting control apparatus (300) may perform a visible lighting communication with the particular lighting to obtain unique address information of the lighting, and receive information linked corresponding to the obtained unique address information (S1020). The linked information may be information on data to be outputted in linkage with the particular lighting, and the outputted data may include various types of data. Hereinafter, an exemplary embodiment where the data is motion picture will be described.

Successively, the lighting control apparatus (300) may determine whether the lighting control apparatus (300) stores a history of previous data service execution with the particular lighting (S1030). More particularly, the lighting control apparatus (300) may determine whether the lighting control apparatus (300) stores a history of pausing playback of motion picture during the previous data service execution with the particular lighting (in other words, during playback of motion picture linked with the particular lighting).

Successively, upon determination that the history of pausing playback is present, the lighting control apparatus (300) may extract the playback history information corresponding to the unique address of the particular lighting (S1040).

In addition, the lighting control apparatus (300) may identify the extracted playback history information (more particularly, information on the time point when the playback was previously paused in a whole playback section of the motion picture), and thereby set a playback start point of the motion picture linked with the particular lighting (S1050).

Successively, the lighting control apparatus (300) may receive or extract the motion picture linked with the particular lighting, and thereby execute playback of the received or extracted motion picture from the set playback start point (S1060).

Meanwhile, upon determination that the history of previous data service executed with the particular lighting is not present, the lighting control apparatus (300) may receive data transmitted from the particular lighting (in other words, data linked with the particular lighting) (S1070).

Successively, the lighting control apparatus (300) may start playback from the beginning of the received data (S1080).

Figure 37:
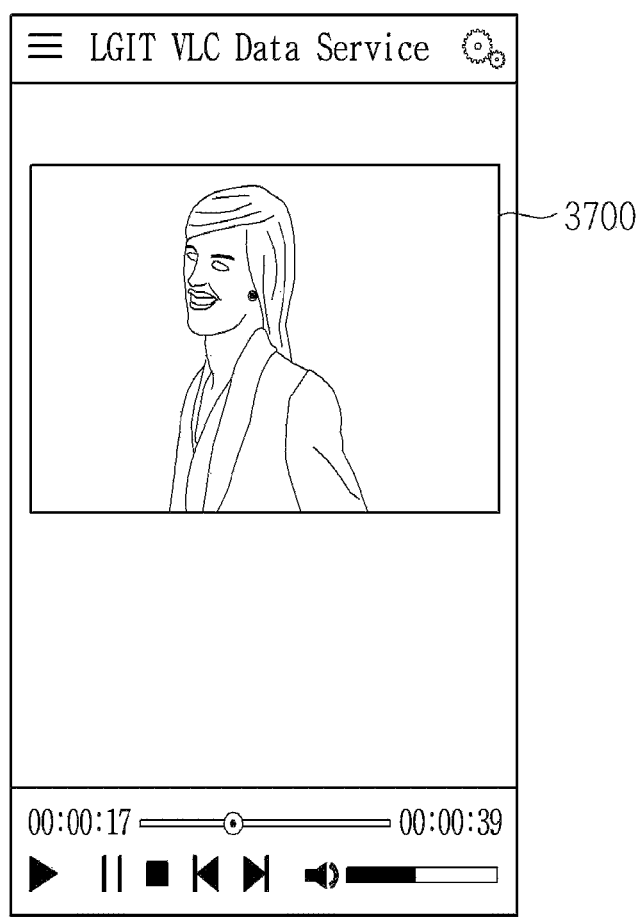
FIG. 37 is a graphic user interface illustrating a process to restart data service according to an exemplary embodiment of the present disclosure.

FIG. 37 is a graphic user interface illustrating a process to restart data service according to an exemplary embodiment of the present disclosure.

That is, as illustrated in FIG. 37, in a case where the data linked with the lighting is motion picture, the lighting control apparatus (300) may display a data output screen (3700) including the linked motion picture.

Here, the linked data may be displayed on the data output screen (3700). The playback start point of the motion picture may be determined by a fact whether the playback history information is present or not.

That is, as described in the above, upon determination that the playback pause event previously occurred, the lighting control apparatus (300) may set the playback pause point as a start point of playback. Accordingly, the lighting control apparatus (300) may start playback from the set start point of playback, such that the motion picture can be played from the point when the playback was paused.

According to some exemplary embodiments, the user may dispose a device having map information of a location where the lighting apparatus is installed under the lighting apparatus that the user desires to register, and configure the device to receive unique address transmitted by the lighting apparatus using VLC (Visible Light Communication). Thereby, the user can easily identify unique address of the lighting apparatus, without dismantling the lighting apparatus installed at the ceiling.

According to some exemplary embodiments, registration process for a plurality of lighting apparatuses may be automatically performed using unique address respectively transmitted from the plurality of lighting apparatuses. Thereby, time consumed in registration of the lighting apparatuses can be significantly reduced, as well as the problem of wrongfully inputted unique address can be overcome.

According to some exemplary embodiments, when additionally installing, dismantling, or maintaining a lighting apparatus, the relevant unique address of the particular lighting apparatus may simply be identified and registered. Thereby, user convenience can be significantly improved.

According to some exemplary embodiments, various data information for providing data service may be linked with the lighting apparatus, and various data service (for example, real-time event information, advertisement information, additional information about a particular location, etc.) using the linked data information may be provided. Thereby, user convenience can be significantly improved.

According to some exemplary embodiments, a current location of the user may be easily provided based on a location of the lighting apparatus installed at the user's location, and information such as a moving route to the destination and historical moving route may be efficiently provided using the map data. Thereby, user convenience can be significantly improved.

In addition, the above descriptions have been made based on exemplary embodiments. However, these embodiments are merely examples and do not limit the present disclosure, so that persons who skilled in the art of the present disclosure may easily transform and modify within the limit of the technical spirit of the present disclosure. For example, each of the components shown in detail in the embodiments of the present disclosure may be implemented in transformation. In addition, the differences relating these transformations and modifications shall be regarded to be included in the scope of the present disclosure as defined in the attached claims.

What is claimed is:
1. A lighting control apparatus, comprising:
a touch screen configured to display a first graphic user interface to provide a VLC (Visible Lighting Communication) service; and
a controller configured to perform visible lighting communication with at least one lighting to provide the VLC service selected through the first graphic user interface,
wherein the VLC service includes a lighting registration service, and wherein
the controller receives first unique address information of a first lighting transmitted through the visible lighting communication from the first lighting to be registered, and registers the first lighting by the received first unique address information;
wherein the first graphic user interface includes:
a first area that displays a selection menu for selecting a VLC service among a plurality of VLC services; and
a second area that displays communication connection status information of a receiver configured to perform visible lighting communication with the first lighting,
wherein the plurality of VLC services provided includes a lighting registration service, a data service, a VLC status checking service, and an indoor navigation service,
wherein the first area includes:
a first selection menu for selecting the lighting registration service;
a second selection menu for selecting the data service;
a third selection menu for selecting the VLC status checking service; and a fourth selection menu for selecting the indoor navigation service, wherein the controller is configured to receive unique address information of the first lighting transmitted through the visible lighting communication from the first lighting to be registered when the first selection menu is selected on the first area, and is configured to register the first lighting by the received unique address information, and wherein the touch screen is configured to display a second graphic user interface to set up the lighting registration service, and wherein the second graphic user interface includes:

a first domain configured to display map data for setting an installation location of the first lighting; and a second domain configured to display a plurality of lighting icons distinguishable from each other by types of lighting, wherein at least one of the plurality of lighting icons representing the types of lightings is movable to the installation location of the first lighting associated with a physical installation position of the first lighting in real-space, wherein the setting the installation location of the first lighting is performable by touching and moving a first lighting icon among the plurality of lighting icons displayable on the second domain to a first location of the map data displayable on the first domain, and the first lighting icon is displayed on the first location of the map data, when the first lighting icon is moved to the first location of the map data, and the installation location of the first lighting to be registered is the real-space location corresponding to the first location to which the first lighting icon is moved on the map data, wherein the touch screen further displays a third graphic user interface for providing a data service, and the third graphic user interface includes a screen configured to select data to be linked in response to received information from a second lighting.

2. The lighting control apparatus of claim 1, wherein the controller is configured to display the map data when registered map data is present and to display a screen for registering the map data when registered map data is not present.

3. The lighting control apparatus of claim 1, wherein the first unique address information is a MAC address of a communicator provided in the first lighting, wherein the first lighting generates an ON/OFF signal by modulating the MAC address and a dimming signal, and irradiates visible light according to the generated ON/OFF signal, and wherein the controller receives the irradiated visible light by a receiver, and performs photoelectric conversion and demodulation of the received visible light to obtain the first unique address information of the first lighting included in the visible light.

4. The lighting control apparatus of claim 1, wherein the controller receives, through the visible lighting communication, information with respect to the data linked corresponding to the second lighting, and outputs data corresponding to the information received through the touch screen, when the data link is completed, and wherein the information with respect to the data linked includes at least one of a second unique address information of the second lighting and information on the data linked corresponding to the second lighting.

5. The lighting control apparatus of claim 4, wherein the outputted data is a motion picture, and wherein the controller determines whether a playback pause event occurs during playback of the motion picture, and upon determining that the playback pause event occurs, saves a playback history information according to the occurrence of the playback pause event, and wherein the playback history information includes the second unique address information of the second lighting and a playback pause point of the motion picture.

6. The lighting control apparatus of claim 5, wherein the controller is configured to detect the playback pause event including a position change from one installation location of the second lighting providing data service to another installation location of another lighting.

7. The lighting control apparatus of claim 5, wherein the controller is configured to detect the playback pause event including an interruption of connection of data communication with the second lighting.

8. The lighting control apparatus of claim 1, wherein the controller receives data transmitted from surrounding lighting through the visible lighting communication, and displays a receiving status screen including information with respect to receiving status of the received data, based on selection of the third selection menu in the first area.

9. The lighting control apparatus of claim 1, wherein the touch screen further displays a third graphic user interface for providing an indoor navigation service, and wherein a portion of the map data corresponding to a third lighting installed at a current location of a user is displayed on the third graphic user interface, and the current location of the user is displayed at a location where the third lighting is installed on the map data.

10. The lighting control apparatus of claim 9, wherein the controller obtains a fourth unique address information of a fourth lighting by performing visible lighting communication with the fourth lighting when the current location of the user is moved to a location at which the fourth lighting is installed, and ascertains an installation location corresponding to the obtained fourth unique address information on the map data, and wherein the location at which the fourth lighting is installed on the map data is displayed on the third graphic user interface as a moved location of the user, and a route from the location where the third lighting is installed to the location where the fourth lighting is installed is displayed as a moving route of the user.

11. An operation method of a lighting control apparatus, comprising:

displaying a first graphic user interface for selecting at least one VLC (Visible Lighting Communication) service;

displaying a second graphic user interface for registering a first lighting, based on selection of a first selection menu for lighting registration on the first graphic user interface;

receiving unique address information of the first lighting transmitted through visible lighting communication from the first lighting to be registered; and registering the first lighting using the received unique address information of the first lighting, when the second graphic user interface is displayed;

wherein the first graphic user interface includes:

a first area that displays a selection menu for selecting a VLC service among a plurality of VLC services; and a second area that displays communication connection status information of a receiver configured to perform visible lighting communication with the first lighting;

wherein the plurality of VLC services includes a lighting registration service, a data service, a VLC status checking service, and an indoor navigation service, wherein the second area includes:

a first domain configured to display map data for setting an installation location of the first lighting; and a second domain configured to display a plurality of lighting icons distinguishable from each other by types of lightings, wherein at least one of the plurality of lighting icons representing the types of lightings is movable to the installation location of the first lighting associated with a physical installation position of the first lighting in real-space, where the setting the installation location of the first lighting is performed by touching and moving a first lighting icon among the plurality of lighting icons displayed on the second domain to a first location of the map data displayed on the first domain, and wherein the first lighting icon is displayed on the first location of the map data when the first lighting icon is moved to the first location of the map data associated with a physical installation position of the first lighting in real-space, and the installation location of the first lighting to be registered is set as the real-space location corresponding to the first location to which the first lighting icon is moved on the map data, the method further comprising:

displaying a third graphic user interface for providing a data service, based on selection of a second selection menu for providing a data service on the first graphic user interface, wherein the third graphic user interface includes a screen for selecting data to be linked in response to received information from a second lighting;

receiving information with respect to the data linked in response to the second lighting through the visible lighting communication when the data link is completed; and outputting data in response to the received information.

12. The operation method of a lighting control apparatus of claim 11, wherein the outputted data is a motion picture, comprising:

determining whether a playback pause event occurs during playback of the motion picture; and saving a playback history information according to the occurrence of the playback pause event, upon determining that the playback pause event occurs, wherein the playback history information includes the second unique address information of the second lighting and a playback pause point of the motion picture.

13. The operation method of a lighting control apparatus of claim 12, wherein the determining of the playback pause event comprises:

detecting the playback pause event including a position change from one installation location of the second lighting providing data service to another installation location of another lighting.

14. The operation method of a lighting control apparatus of claim 12, wherein the determining of the playback pause event comprises:

detecting the playback pause event including an interruption of connection of data communication with the second lighting.

15. The operation method of a lighting control apparatus of claim 11, comprising:

receiving data transmitted from surrounding lighting through the visible lighting communication, based on selection of a third selection menu for checking VLC status on the first graphic user interface; and displaying a fourth graphic user interface including information with respect to receiving status of the received data.

16. The operation method of a lighting control apparatus of claim 11, comprising:

displaying map data corresponding to a third lighting installed at a current location of a user and the current location of the user at a location where the third lighting is installed on the map data, based on selection of an indoor navigation service menu on the first graphic user interface.

17. The operation method of a lighting control apparatus of claim 16, comprising:

changing the current location of the user to a location where the fourth lighting is installed when the current location of the user is moved to a location where a fourth lighting is installed; and displaying a route from the location where the third lighting is installed to the location where the fourth lighting is installed as a moving route of the user.

* * * * *